(12) United States Patent
Kato et al.

(10) Patent No.: US 7,189,278 B2
(45) Date of Patent: Mar. 13, 2007

(54) METHOD AND APPARATUS FOR PRODUCING SEMICONDUCTOR OR METAL PARTICLES

(75) Inventors: Kenji Kato, Hatogaya (JP); Yukio Yamaguchi, Kawasaki (JP); Seiichi Isomae, Hanno (JP); Masaki Miyazaki, Hirakata (JP)

(73) Assignee: Clean Venture 21 Corporation, Osaka (JP)

( * ) Notice: Subject to any disclaimer, the term of this patent is extended or adjusted under 35 U.S.C. 154(b) by 337 days.

(21) Appl. No.: 10/418,317

(22) Filed: Apr. 18, 2003

(65) Prior Publication Data

US 2004/0007790 A1    Jan. 15, 2004

(30) Foreign Application Priority Data

Apr. 18, 2002  (JP)  ............................. 2002-116714
Dec. 25, 2002  (JP)  ............................. 2002-373331

(51) Int. Cl.
    *B22F 9/06*  (2006.01)
(52) U.S. Cl. .......................................... 75/331; 75/340
(58) Field of Classification Search .................. 75/331, 75/340

See application file for complete search history.

(56) References Cited

U.S. PATENT DOCUMENTS

| 4,188,177 A | 2/1980 | Kilby et al. |
| 4,322,379 A | 3/1982 | Kilby et al. |
| 4,386,896 A * | 6/1983 | Ray ............................. 425/7 |
| 6,074,476 A | 6/2000 | Hanabe et al. |
| 6,153,007 A | 11/2000 | Nakata |
| 6,221,165 B1 | 4/2001 | Zhang et al. |
| 6,554,166 B2 * | 4/2003 | Sato et al. ................. 222/594 |
| 2002/0096206 A1 | 7/2002 | Hamakawa et al. |

FOREIGN PATENT DOCUMENTS

| JP | 59-118805 | 7/1984 |
| JP | 61-124179 | 6/1986 |
| JP | 1-188608 | 7/1989 |
| JP | 10-33969 | 2/1998 |
| JP | 2002-164554 | 6/2002 |
| JP | 2002-292265 | 10/2002 |

* cited by examiner

*Primary Examiner*—George Wyszomierski
(74) *Attorney, Agent, or Firm*—McDermott Will & Emery LLP

(57) ABSTRACT

A method for producing semiconductor or metal particles comprises the steps of: storing a semiconductor or metal melt in a crucible having a nozzle; supplying a gas comprising at least one selected from the group consisting of He, Ne, Ar, Kr and Xe into the crucible such that the pressure of the supplied gas in a space over the melt in the crucible is higher than the pressure of a gaseous phase into which the melt is dropped; dropping the melt from the nozzle into the gaseous phase by the pressure of the gas to form liquid particles; and solidifying the liquid particles in the gaseous phase to obtain semiconductor or metal particles. The crucible comprises at least one selected from the group consisting of hexagonal BN, cubic BN, $Si_3N_4$, $TiB_2$, $ZrB_2$, zirconia and stabilized zirconia at least near the nozzle. Alternatively, the crucible comprises quartz glass at least near the nozzle and has a heat-resistant support member for suppressing deformation caused by a decrease in viscosity of the quartz glass at high temperatures.

25 Claims, 22 Drawing Sheets

METHOD AND APPARATUS FOR PRODUCING SEMICONDUCTOR OR METAL PARTICLES

BACKGROUND OF THE INVENTION

The present invention relates to a method and apparatus for producing semiconductor or metal particles, particularly particles of a semiconductor or metal having high melting point.

A typical method for producing semiconductor or metal particles is a method in which spherical particles are produced by heating and melting a solid raw material and dropping its melt into a gaseous phase. Spherical particles produced in such a method are used, for example, as spherical semiconductors to be incorporated into a solar array. As disclosed in Japanese Examined Patent Publication No. Hei 7-54855, for example, such a solar array generates photoelectromotive force by electrically connecting spherical silicon semiconductors to a metal foil matrix and applying light to the spherical semiconductors.

A specific method for producing spherical particles is a method disclosed in Japanese Laid-Open Patent Publication No. 2002-292265, for example. In this method, a semiconductor such as silicon (Si) stored in a crucible is heated and melted, and a gas such as Ar or $N_2$ is supplied into the space over the melt of the semiconductor in the crucible, so that the melt is dropped from the nozzle provided at the bottom of the crucible into a gaseous phase by the pressure of the supplied gas. Further, U.S. Pat. No. 4,188,177 discloses a method that uses a cylindrical crucible made of quartz glass for producing Si particles. In this method, a Si melt in the crucible is pressurized by an inert gas such as He or Ar to drop the melt from the nozzle into a gaseous phase.

As a method for producing metal particles suitable for powder metallurgy, Japanese Examined Patent Publication No. Sho 60-59283 discloses a technique of jetting a metal melt stored in a crucible from the nozzle of the crucible by applying the pressure of an inert gas such as Ar, He, Xe or Kr. Further, Japanese Patent No. 2674053 discloses a method for producing fine particles of metal such as gold, using a heat-resistant crucible. In this method, a molten metal in the crucible is pressurized by an inert gas to drop the melt from the nozzle of the crucible into a gaseous phase.

According to the experiments performed by the inventors of the present invention, in any of the above-mentioned production methods of spherical particles, the speed at which the semiconductor or metal melt stored in the crucible drops from the nozzle often lowers with the passage of time, resulting in stop of the dropping of the melt even if the pressurization by the inert gas is heightened.

This has four reasons. First, when the melt is dropped from the nozzle, the bottom face of the crucible becomes wet with the melt, so that solidified semiconductor or metal adheres to and near the nozzle on the bottom face of the crucible, thereby clogging the nozzle. Second, the melt having high temperature easily reacts with the crucible material to heighten the wettability of the crucible material by the melt, and the reaction products accumulate in and near the nozzle, thereby clogging the nozzle. Third, the reaction products of the melt and the pressurization gas accumulate in and near the nozzle, thereby clogging the nozzle. Fourth, due to the exposure of the crucible to high temperatures by the heating for melting the raw material in the crucible or the heat transmission from the melt stored in the crucible, the crucible material becomes softened, and the nozzle becomes deformed upon the application of load such as the pressurization gas to the softened crucible material, resulting in closing of the nozzle.

When the flow of the melt is hindered in and near the nozzle as described above, the dropping speed of the melt gradually lowers or the dropping stops even if the melt is pressurized by a constant gas pressure. Once the nozzle is completely closed, the melt will not drop even if the gas pressure is raised to its highest possible level. This problem cannot be solved simply by regulating the gas pressure depending on the dropping speed.

Further, in the above-described production methods of spherical particles, the reaction products of the melt and the crucible material are liable to be included in the melt as impurities, so the spherical particles produced often include large amounts of impurities. When these spherical particles are used as semiconductor elements or their bases, such impurities have significant effects on the electrical characteristics of the semiconductor elements.

In order to solve these problems, it is necessary to use a crucible which has low wettability and low reactivity with respect to a melt, which is chemically stable to the melt and which has excellent thermal resistance, in combination with the selection of a pressurization gas which is unreactive to the melt. However, it is extremely difficult to find such crucible material satisfying all the requirements. For example, tangsten, molybdenum, tantalum, alumina and the like have excellent thermal resistance, but easily react with a Si melt to produce silicides. Further, carbon, which is conventionally used as the crucible material, reacts with the Si melt to produce SiC on the surface. These reaction products considerably heighten the wettability and are liable to be included in the melt. Hence, it is not appropriate to use these materials in their natural state as the crucible materials.

Of the above-mentioned prior art techniques, when quartz glass is used as the crucible material, no problems are caused by the first and second reasons because of the extremely excellent chemical stability and non-wettability of quartz glass with respect to a high temperature melt, and further, there is no concern that impurities are included into the melt. As described above, quartz glass has excellent characteristics as the crucible material, but its thermal resistance is not necessarily sufficient. Quartz glass has such properties that its viscosity lowers as the temperature becomes higher and it therefore deforms when a load is applied thereto. The occurrence of such deformation generally becomes remarkable at a temperature of around 1200° C.

Therefore, the use of a crucible made of quartz glass for producing spherical particles of a semiconductor or metal having high melting point such as Si causes such problems that the nozzle of the crucible is closed by the fourth reason so that the dropping speed of the melt lowers or the dropping stops even if the melt is pressurized by a constant gas pressure.

BRIEF SUMMARY OF THE INVENTION

An object of the present invention is to provide a method and apparatus capable of producing high-purity spherical particles having uniform particle size distribution with good productivity by suppressing the reactions between a melt and a crucible and between the melt and a pressurization gas and ensuring thermal resistance of the crucible.

A first method for producing semiconductor or metal particles in accordance with the present invention comprises the steps of: storing a semiconductor or metal melt in a crucible having a nozzle, the crucible being made of a material comprising at least one selected from the group consisting of hexagonal BN, cubic BN, $Si_3N_4$, $TiB_2$, $ZrB_2$, zirconia and stabilized zirconia at least near the nozzle; supplying a gas comprising at least one selected from the group consisting of He, Ne, Ar, Kr and Xe into the crucible such that the pressure of the supplied gas in a space over the melt in the crucible is higher than the pressure of a gaseous phase into which the melt is dropped; dropping the melt from the nozzle into the gaseous phase by the pressure of the gas to form liquid particles; and solidifying the liquid particles in the gaseous phase to obtain semiconductor or metal particles.

In the first method for producing semiconductor or metal particles in accordance with the present invention, the crucible may be wholly made of the above-mentioned material. The crucible may comprise: a crucible body having a mounting hole at its bottom; and a nozzle member mounted on the mounting hole, the nozzle member having a nozzle and being made of the above-mentioned material. A coating layer comprising the above-mentioned material may be formed at least near the nozzle on the bottom face of the crucible.

A first apparatus for producing semiconductor or metal particles in accordance with the present invention is an apparatus for producing semiconductor or metal particles by the first production method of the present invention. The first production apparatus is characterized by comprising: a crucible for storing a semiconductor or metal melt and dropping the melt from a nozzle provided at the bottom of the crucible, the crucible being made of a material comprising at least one selected from the group consisting of hexagonal BN, cubic BN, $Si_3N_4$, $TiB_2$, $ZrB_2$, zirconia and stabilized zirconia at least near the nozzle; and a gas source for supplying a gas comprising at least one selected from the group consisting of He, Ne, Ar, Kr and Xe into the crucible such that the pressure of the supplied gas in a space over the melt in the crucible is higher than the pressure of a gaseous phase into which the melt is dropped.

A second method for producing semiconductor or metal particles in accordance with the present invention comprises the steps of: storing a semiconductor or metal melt in a crucible having a nozzle, the crucible being made of quartz glass at least near the nozzle, the crucible further having a heat-resistant support member for suppressing deformation caused by a decrease in viscosity of the quartz glass at high temperatures; supplying a gas comprising at least one selected from the group consisting of He, Ne, Ar, Kr and Xe into the crucible such that the pressure of the supplied gas in a space over the melt in the crucible is higher than the pressure of a gaseous phase into which the melt is dropped; dropping the melt from the nozzle into the gaseous phase by the pressure of the gas to form liquid particles; and solidifying the liquid particles in the gaseous phase to obtain semiconductor or metal particles.

In the second method for producing semiconductor or metal particles in accordance with the present invention, the crucible may comprise: a crucible body which has a nozzle at its bottom and is made of quartz glass; and a support member for supporting the outer side faces and bottom of the crucible body except at least near the nozzle. The crucible may comprise: a support member which has a mounting hole at its bottom and serves also as a crucible body; and a nozzle member mounted on the mounting hole, the nozzle member having a nozzle and being made of quartz glass.

A second apparatus for producing semiconductor or metal particles in accordance with the present invention is an apparatus for producing semiconductor or metal particles by the second production method of the present invention. The second production apparatus is characterized by comprising: a crucible for storing a semiconductor or metal melt and dropping the melt from a nozzle provided at the bottom of the crucible, the crucible being made of quartz glass at least near the nozzle, the crucible further having a heat-resistant support member for suppressing deformation caused by a decrease in viscosity of the quartz glass at high temperatures; and a gas source for supplying a gas comprising at least one selected from the group consisting of He, Ne, Ar, Kr and Xe into the crucible such that the pressure of the supplied gas in a space over the melt in the crucible is higher than the pressure of a gaseous phase into which the melt is dropped.

It is preferable to apply the methods and apparatus for producing semiconductor or metal particles in accordance with the present invention to the production of silicon particles.

In the methods and apparatus for producing semiconductor or metal particles in accordance with the present invention, it is preferable that the upper opening end of the nozzle is curved so that the internal diameter of the nozzle becomes greater. It is preferable that the lower opening end of the nozzle is curved so that the internal diameter of the nozzle becomes greater. Also, it is preferable that the inner face of the crucible is inclined and tapered down toward the upper opening end of the nozzle. Further, it is preferable that the pressure of the gas is higher than that of the gaseous phase into which the melt is dropped by 1 to 100 kPa.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
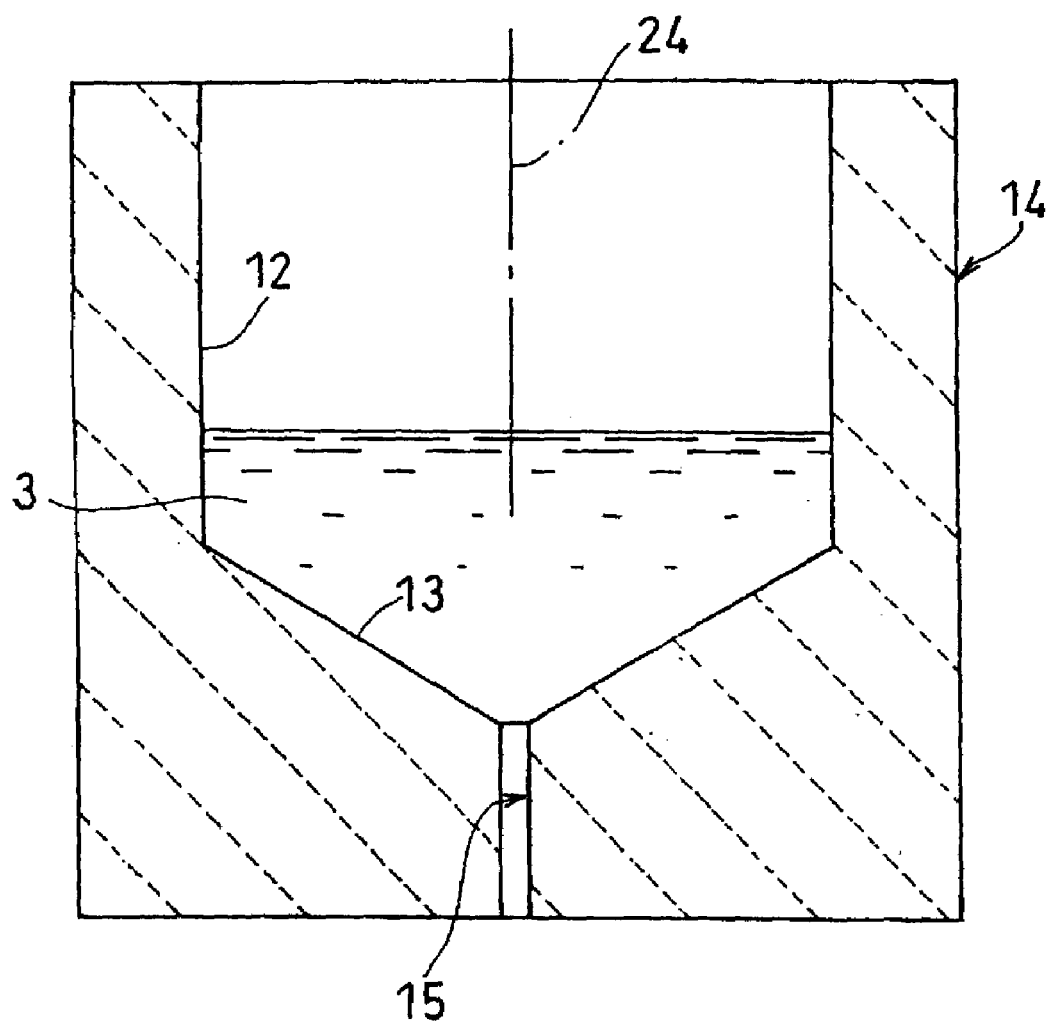
FIG. 1 is a longitudinal sectional view of a crucible in a first embodiment of the present invention.

The present invention relates to a method and apparatus for producing spherical particles in which a gas is supplied to a crucible having a nozzle at its bottom so that a melt contained in the crucible is dropped from the nozzle into a gaseous phase by the pressure of the supplied gas and its own weight of the melt.

A first production method and a first production apparatus in accordance with the present invention use a crucible which is, at least near its nozzle, made of a material comprising at least one selected from the group consisting of hexagonal BN, cubic BN, $Si_3N_4$, $TiB_2$, $ZrB_2$, zirconia and stabilized zirconia. The reactivity and wettability of this group are low with respect to a high temperature melt. As a gas for pressurization, the first method and apparatus utilize an inert gas comprising at least one selected from the group consisting of He, Ne, Ar, Kr and Xe, which are not reactive to a high temperature melt.

Thus, impurities are not included into the melt from the crucible, and the flow of the melt in the crucible is not hampered. Further, the nozzle is prevented from getting clogged. Therefore, the melt can be dropped in a continuous and stable manner, so that it is possible to produce high-purity spherical particles having uniform particle size distribution with high productivity.

The material of the crucible is required to have chemical stability and thermal resistance with respect to a semiconductor or metal melt having high melting point and high reactivity, but it is extremely difficult to find such material satisfying all the requirements. For example, tangsten, molybdenum, tantalum, alumina, carbon and the like have sufficient thermal resistance, but easily react with a high temperature melt such as molten Si. The products of such reaction not only heighten the wettability with respect to the melt considerably but also contaminate the melt. Hence, these materials cannot be used in their natural state as the materials of the crucible for producing spherical particles of a semiconductor or metal having high melting point.

As the result of experimental examination of numerous materials having good thermal resistance, the inventors of the present invention have found preferable crucible materials for producing spherical particles of a semiconductor or metal having high melting point. These crucible materials have chemical stability and thermal resistance which are sufficient from the practical viewpoint although they may not be completely unreactive to a high temperature melt. That is, the reaction products of these crucible materials and the melt do not substantially heighten the wettability of the crucible, and further, they are hardly included into the melt.

Among the crucible materials in accordance with the present invention, hexagonal BN, cubic BN, $Si_3N_4$, $TiB_2$ and $ZrB_2$ have particularly superior non-wettability with respect to the melt, and, zirconia and various stabilized zirconia are especially superior in terms of preventing the inclusion of impurities into the melt. Further, since the above-mentioned crucible materials have high thermal resistance, crucibles comprising these materials can store the melt of semiconductors and metals that generally have a melting point of not lower than 1000° C.

As the crucible material in accordance with the present invention, any substance of hexagonal BN, cubic BN, $Si_3N_4$, $TiB_2$, $ZrB_2$, zirconia and stabilized zirconia may be used singly, and compounds consisting of these substances such as BN-$Si_3N_4$ may also be used. Further, compounds comprising these substances (not less than 70 wt %, preferably not less than 90 wt %) and other substance(s), such as BN-AlN or BN-$Al_2O_3$, may also be used.

Typical examples of stabilized zirconia used in the present invention include yttria stabilized zirconia, calcia stabilized zirconia and magnesia stabilized zirconia. Stabilized zirconia is sintered zirconia to which a stabilizer such as $Y_2O_3$, CaO or MgO is added to suppress the phase transition of zirconia ($ZrO_2$). Stabilized zirconia includes partially stabilized zirconia, to which a stabilizer is added at 2 to 3 mol %, and fully stabilized zirconia, to which a stabilizer is added in a relatively large amount, such as yttria stabilized zirconia, to which $Y_2O_3$ is added at 8 mol %. In the present invention, both partially stabilized zirconia and fully stabilized zirconia can be used as the crucible materials.

A crucible comprising such zirconia based material reacts with a Si melt, thereby producing a small amount of zirconium silicides on the surface of the crucible. However, the silicides have little effect on the excellent non-wettability inherent in the zirconia based crucible materials, so that it does not substantially impede the dropping of the melt.

However, even when the above-mentioned crucible materials of the present invention are used, the melt cannot be dropped smoothly if $N_2$, a conventional pressurization gas, is used. The inventors of the present invention have found that this problem is ascribed to the fact that the reaction product of a melt and nitrogen, for example, $Si_3N_4$ produced by the reaction of a Si melt and nitrogen, accumulates in and near the nozzle and clogs the nozzle. In light of this fact, the inventors utilize a fully inert gas of He, Ne, Ar, Kr or Xe as the pressurization gas in combination with the use of the crucible materials of the present invention having low reactivity to the melt, and by the synergistic effect of these crucible material and gas, they have made it possible to eliminate the problems such as the clogging of the nozzle and produce high-purity spherical particles having uniform particle size distribution continuously.

Figure 7:
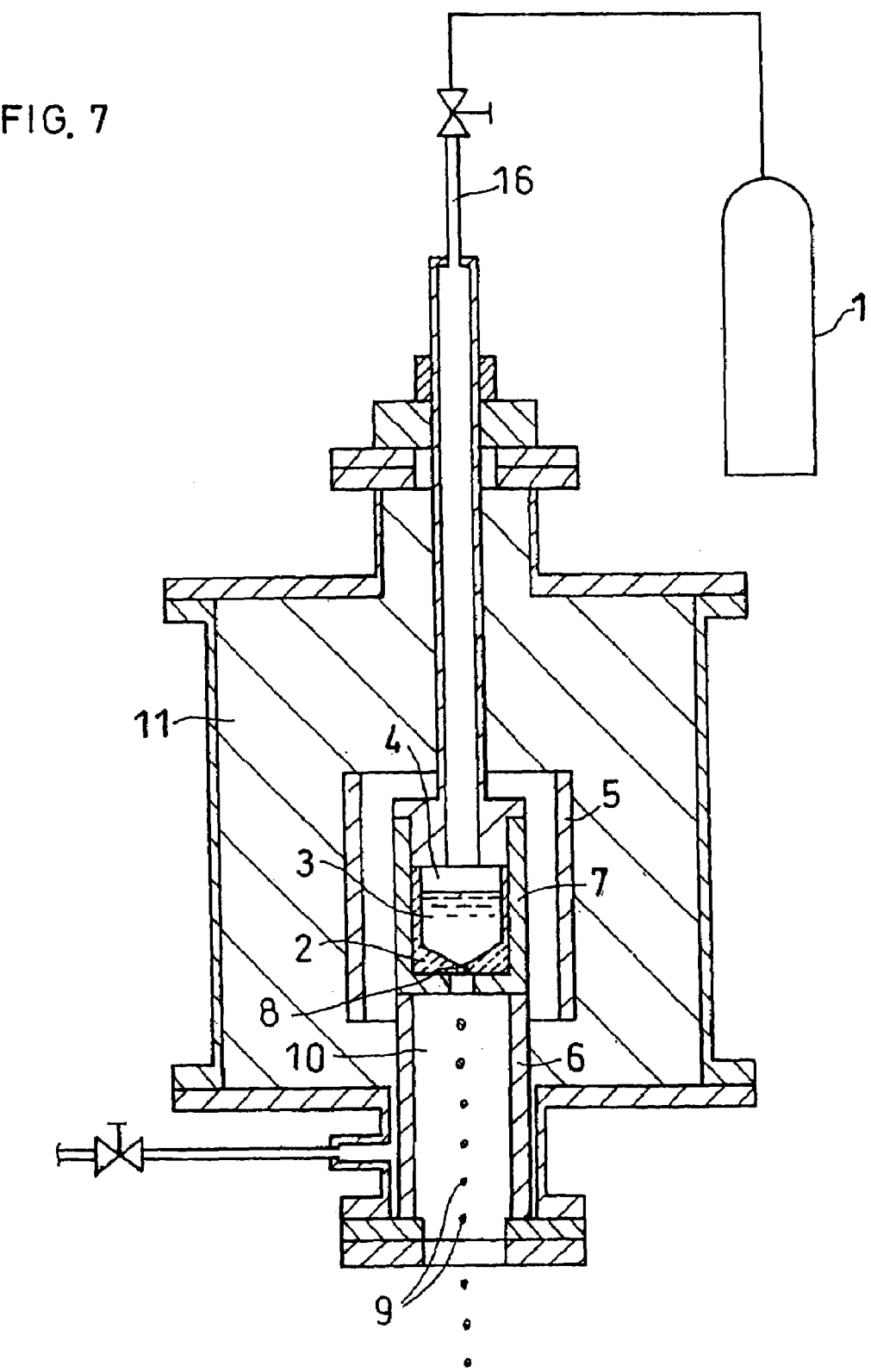
FIG. 7 is a schematic view of a part of a production apparatus in one embodiment of the present invention, in which a raw material is melted and the melt is dropped.

FIG. 7 is a schematic view of a part of an apparatus for producing spherical particles in one embodiment of the present invention, in which a raw material is melted and the melt is dropped. From a gas source 1, an inert gas for pressurization is supplied into a space 4 over a melt 3 in a crucible 2 through a tube 16. The crucible 2 in accordance with the present invention is heated by an electric heater 5, such as a carbon heater, surrounding the crucible. The crucible 2 is disposed in a support cylinder 7 supported by the opening end of a drop cylinder 6. Droplets 9 of the melt 3 drop from a nozzle 8 through a gaseous phase 10 inside the drop cylinder 6. The crucible 2, the electric heater 5 and the like are covered with a heat insulating material 11. The inert gas supplied to the space 4 over the melt 3 is a gas comprising at least one selected from the group consisting of He, Ne, Ar, Kr or Xe. In order to further enhance the productivity, the crucible 2 may be provided with a plurality of the nozzles 8.

FIGS. 1 to 6 show various embodiments of the crucible 2 of the present invention to be incorporated into the apparatus of FIG. 7. FIG. 1 is a longitudinal sectional view of a crucible in a first embodiment, in which the crucible is wholly made of the crucible material of the present invention. A crucible 14 has a circular section perpendicular to an axis line 24, and the inner face of the crucible comprises a cylindrical part 12 and a conical part 13. At the bottom of the crucible 14, a nozzle 15 is formed on the same axis as the axis line 24. The crucible can be produced, for example, by pressing a mixture of a powdery crucible material, a binder and the like or by sintering the pressed mixture.

Figure 3:
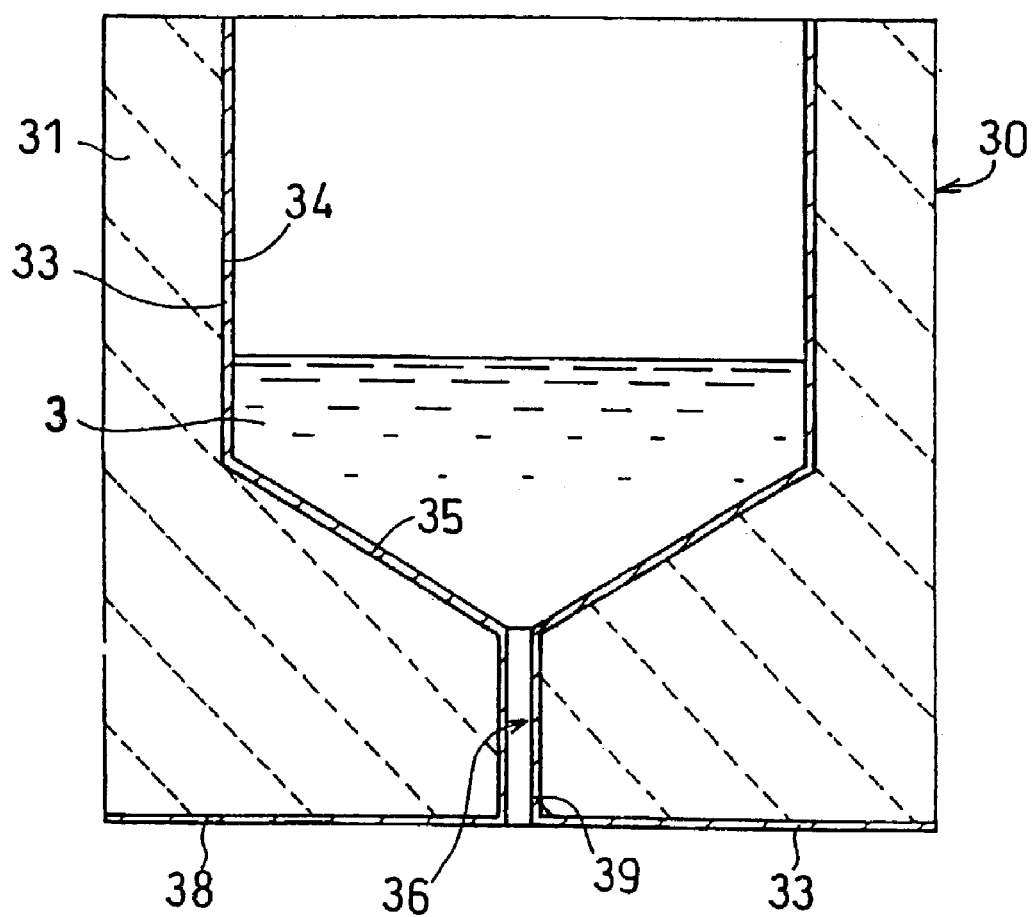
FIG. 3 is a longitudinal sectional view of a crucible in a second embodiment of the present invention.

FIG. 3 is a longitudinal sectional view of a crucible in a second embodiment, in which a crucible body is coated with a coating layer comprising the crucible material of the present invention at least near a nozzle on the bottom face of the crucible. A crucible 30 comprises a crucible body 31, and a coating layer 33 is formed on a bottom face 38 of the crucible body 31 including a lower opening end 39 of a nozzle 36. The coating layer 33 may also be formed on the inner surface of a part of the crucible body 31 to store a melt 3, i.e., a cylindrical part 34 and a conical part 35. Further, the coating layer 33 may also be formed on the internal wall of the nozzle 36. The thickness of the coating layer 33 is preferably from 0.1 to 5 μm.

The material of the crucible body may also be a heat-resistant material whose non-wettability or chemical stability is not necessarily sufficient, such as carbon, $Al_2O_3$, SiC, tangsten, molybdenum or tantalum. The coating layer may be formed, for example, by chemical vapor deposition (CVD) or physical vapor deposition (PVD), or by a method of applying a paste containing a powdery crucible material onto the crucible body and thermally treating it.

Crucibles in third and fourth embodiments comprise a crucible body having a mounting hole at its bottom. The crucibles-further comprise a nozzle member which has a nozzle and is mounted on the mounting hole. The nozzle member is made of the crucible material of the present invention, and the crucible body may be made of either the crucible material of the present invention or the above-described heat-resistant material whose non-wettability or chemical stability is not sufficient.

Figure 4:
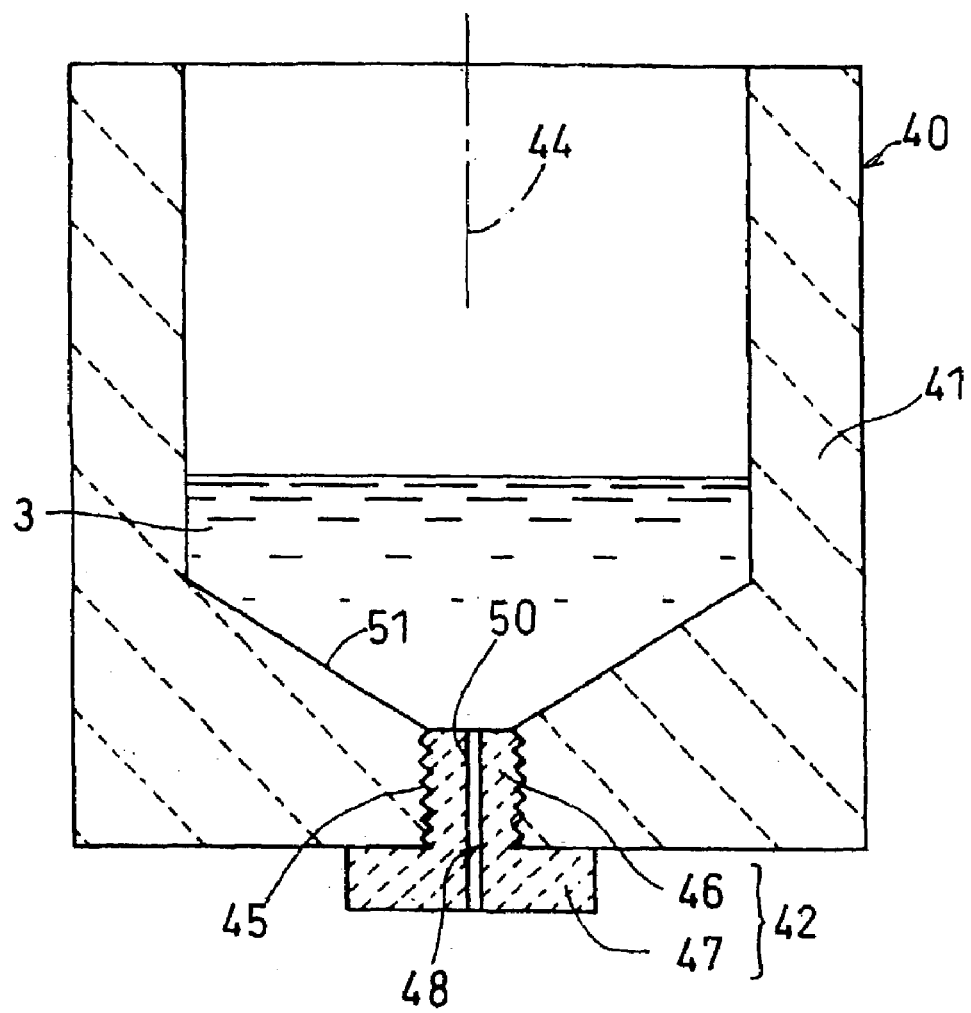
FIG. 4 is a longitudinal sectional view of a crucible in a third embodiment of the present invention.

FIG. 4 is a longitudinal sectional view of the crucible in the third embodiment. A crucible 40 comprises a crucible body 41 having a mounting hole 45 at its bottom. The mounting hole 45 has an internal thread and is formed on the same axis as an axis line 44. A nozzle member 42 comprises an external thread part 46 and a base part 47, and the external thread part 46 is screwed into the mounting hole 45 so that it is detachable for replacement. The nozzle member 42 has a nozzle 48 that is formed on the same axis as the axis line 44. The base part 47 is in contact with the lower face of the bottom of the crucible body 41, and an upper opening end 50 of the nozzle 48 is joined to the lower part of a conical part 51.

Figure 5:
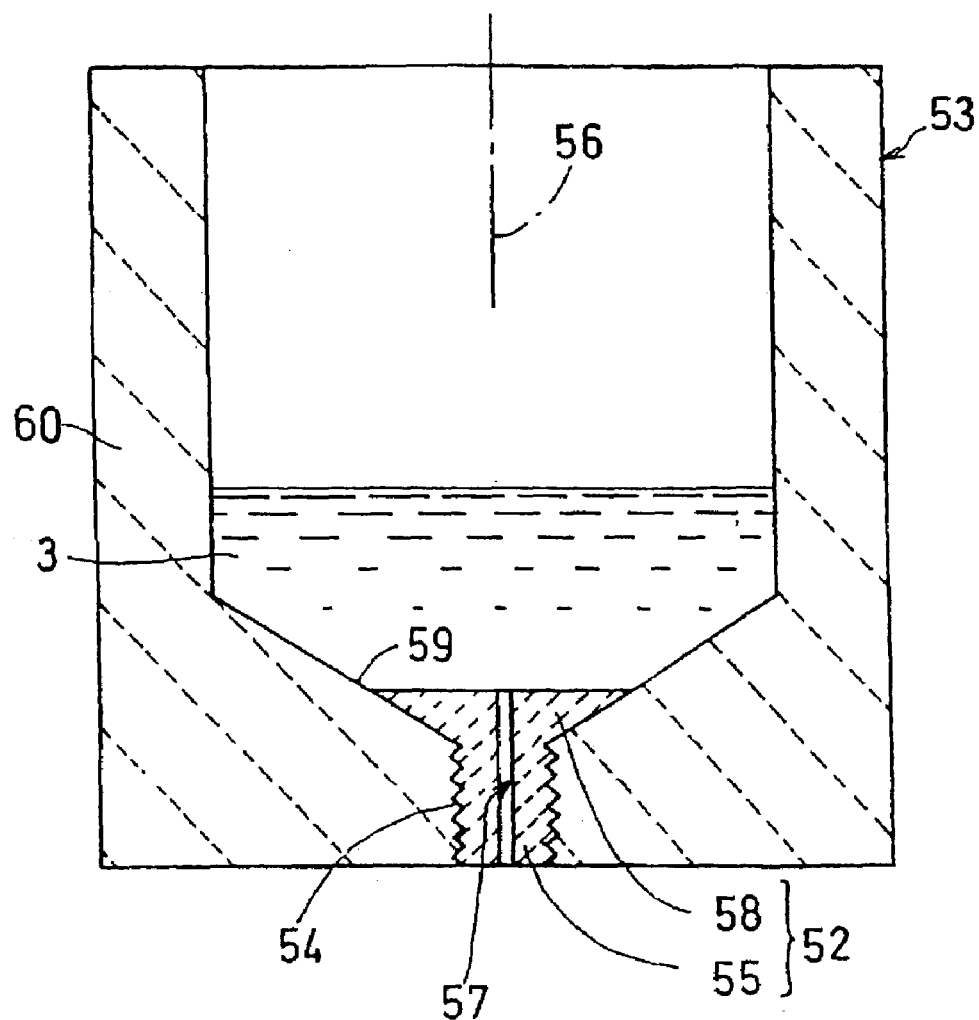
FIG. 5 is a longitudinal sectional view of a crucible in a fourth embodiment of the present invention.

FIG. 5 is a longitudinal sectional view of the crucible in the fourth embodiment.

A crucible body 60 of a crucible 53 has the same structure as that of the crucible body 41 in FIG. 4, with a mounting hole 54 formed at its bottom. A nozzle member 52 comprises an external thread part 55 screwed into an internal thread of the mounting hole 54 and a top part 58. The nozzle member 52 also has a nozzle 57 that is formed on the same axis as an axis line 56. The top part 58 is joined to a conical part 59 of the crucible body 60.

Figure 6:
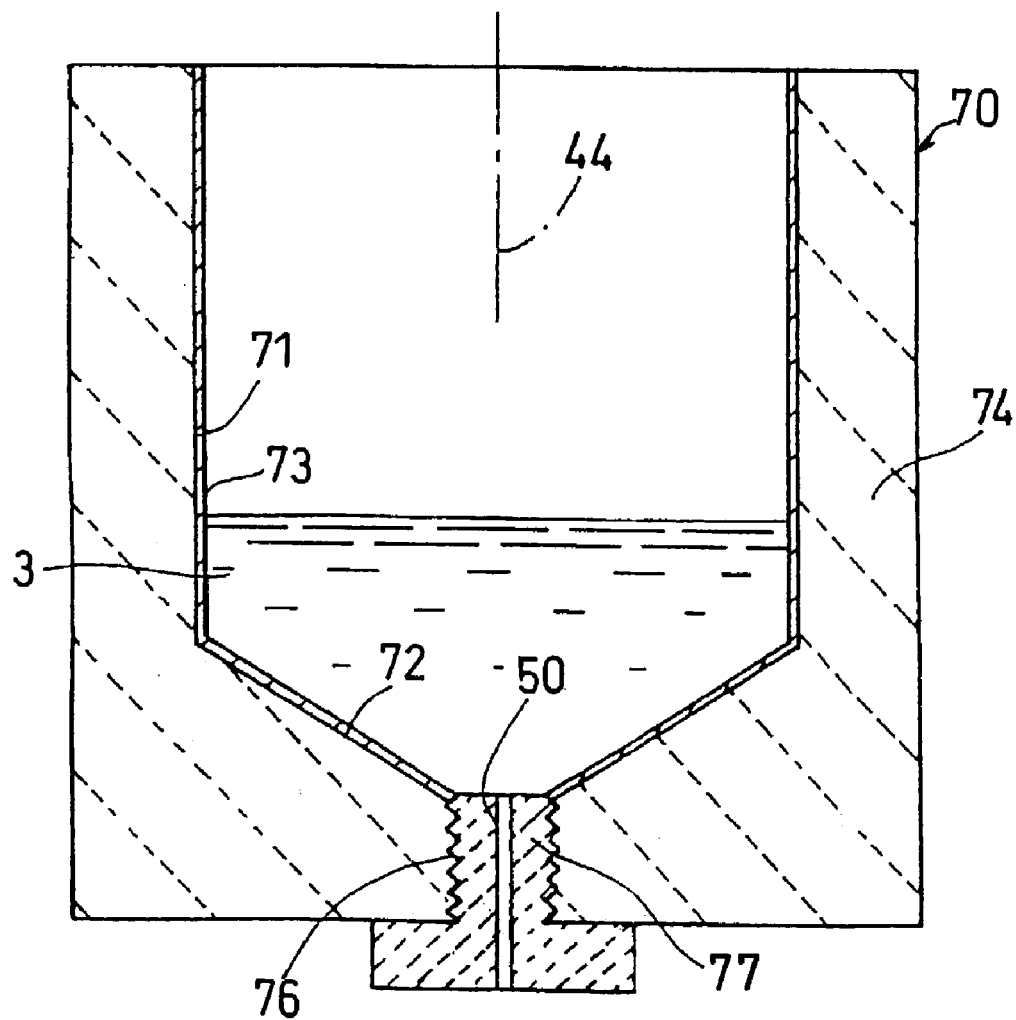
FIG. 6 is a longitudinal sectional view of a crucible in a fifth embodiment of the present invention.

A crucible in a fifth embodiment has a coating layer comprising the crucible material of the present invention, the coating layer being formed on the inner surface of the crucible body of the crucible in the third or fourth embodiment. FIG. 6 is a longitudinal sectional view of the crucible in the fifth embodiment. In a crucible 70, a coating layer 73, which is the same as that in FIG. 3, is formed on the inner surface of a cylindrical part 71 and a conical part 72 of a crucible body 74. In the lower part of the crucible body 74, a mounting hole 76, which is the same as that in FIG. 4, is formed, and a nozzle member 77, which is the same as that in FIG. 4, is detachably fitted into the mounting hole 76.

In a second production method and a second production apparatus in accordance with the present invention, a crucible is made of quartz glass, whose wettability and reactivity are extremely low with respect to a melt, at least near its nozzle and has a support member. The support member suppresses deformation of the quartz glass when the crucible is heated to melt a raw material therein or when the viscosity of the quartz glass is decreased by the heat transmission from the melt in the crucible. By using the above-described crucible in combination with the inert gas for pressurization which is unreactive to a high temperature melt, impurities are not included into the melt from the crucible, the flow of the melt in the crucible is not hampered, and the nozzle is prevented from getting clogged. Therefore, the melt can be dropped in a continuous and stable manner, so that it is possible to produce high-purity spherical particles having uniform particle size distribution with high productivity.

As described above, the crucible materials such as BN and zirconia used in the first production method and apparatus of the present invention have practically sufficient chemical stability, though not necessarily perfect, with respect to a high temperature melt. They also have excellent thermal resistance. Thus, even when these crucible materials are brought in contact with a high temperature melt for a long period of time, their mechanical strength is retained, their non-wettability with respect to the melt is substantially ensured, and inclusion of impurities into the melt is hardly observed.

On the other hand, quartz glass used as the crucible material in the second production method and apparatus of the present invention is characterized in that it is highly chemically stable with respect to a high temperature melt and has very little impurities. However, quartz glass has such characteristics that it tends to deform when heated to high temperatures of more than about 1200° C. upon the melting of the raw material or the contact with the melt due to a considerable decrease in viscosity.

The inventors of the present invention have experimentally examined many kinds of potential crucible materials and discovered the following. When crucibles made of quartz glass in particular are heated to high temperatures of around 1450° C. in melting a raw material Si and storing the melt, they yield no reaction products with Si, and their inherent non-wettability is retained. However, when heated to high temperatures and softened, crucibles made of quartz glass deform considerably in such a manner as to be enlarged outward and downward by their own weight of the crucible and the melt inside the crucible, and further, by the pressure of the gas applied onto the melt. Thus, due to the deformation of the quartz glass near the nozzle, the nozzle is narrowed and, in extreme cases, closed, thereby making it impossible to drop the melt from the nozzle smoothly.

Figure 8:
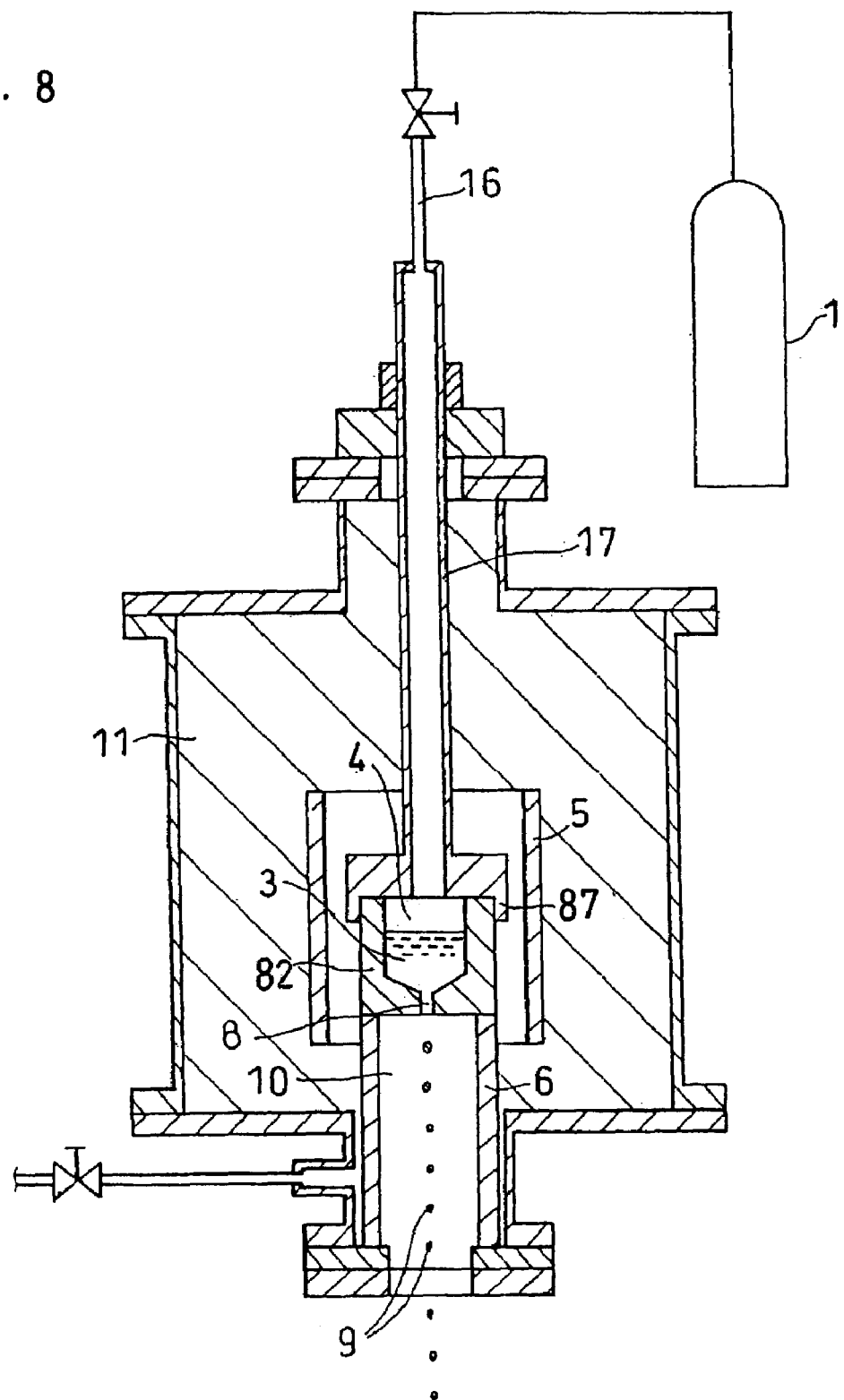
FIG. 8 is a schematic view of a part of a production apparatus in another embodiment of the present invention, in which a raw material is melted and the melt is dropped.

FIG. 8 is a schematic view of an apparatus used in an experiment of melting a Si material in a crucible made of quartz glass and dropping the melt. Since the apparatus of FIG. 8 has the same structure as the apparatus of FIG. 7 except for the following partial difference, explanations of the same components are omitted. The main difference of FIG. 8 from FIG. 7 is the method of mounting the crucible. In FIG. 8, a crucible 82 is directly mounted on a crucible mounting member 87 of a heat-resistant gas supply pipe 17 having a tube 16, unlike FIG. 7 in which the crucible 2 is accommodated in the support cylinder 7. The crucible 82 is fitted gas-tightly to the crucible mounting member 87 such that an inert gas for pressurization introduced into the crucible does not leak out. The upper opening end of a drop cylinder 6 is in contact with the circumferential edge of bottom of the crucible. Droplets 9 of a melt 3 drop from a nozzle 8 through a space 10 inside the drop cylinder 6.

Figure 9:
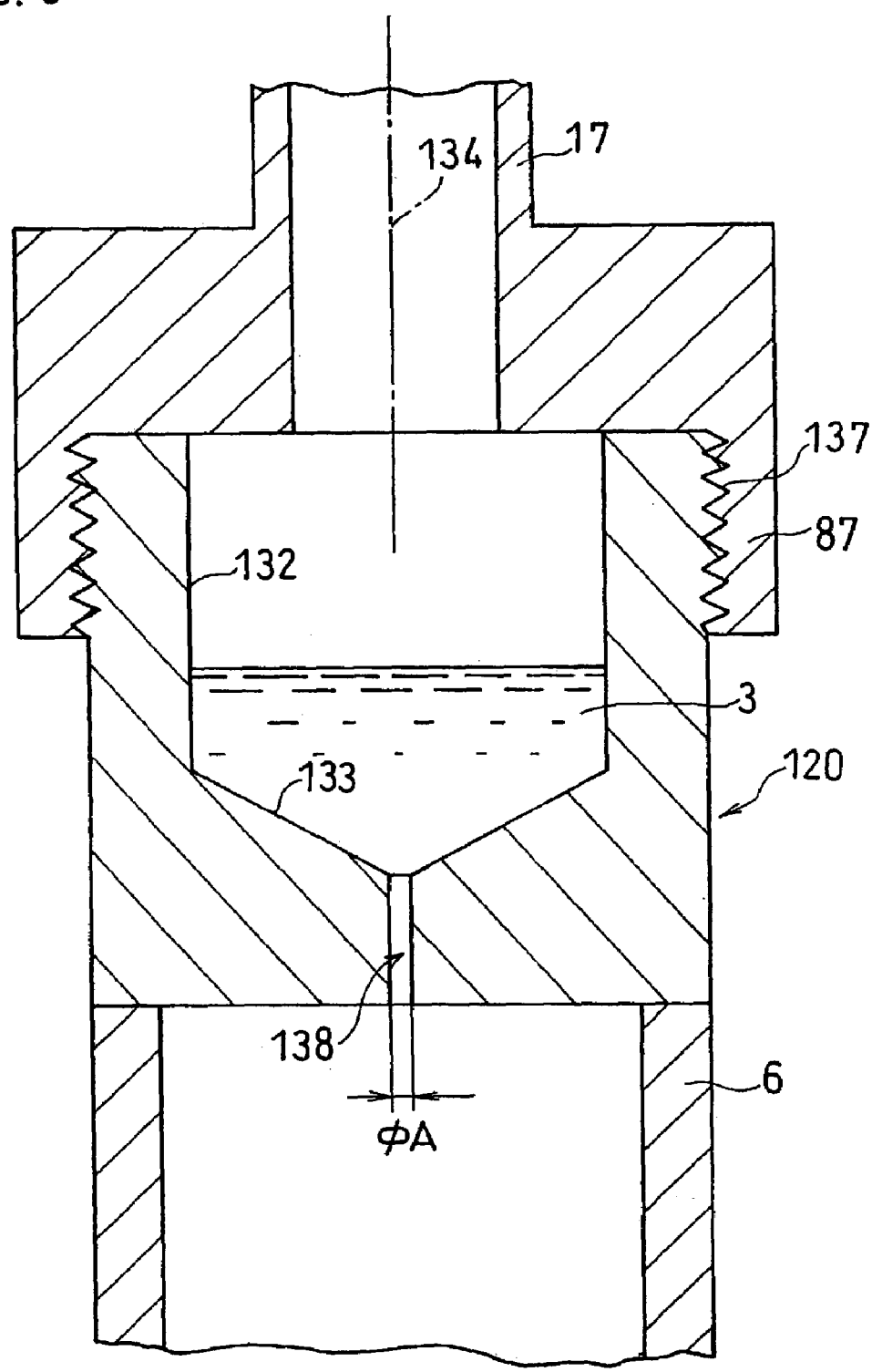
FIG. 9 is a longitudinal sectional view of a crucible made of quartz glass.
Figure 10:
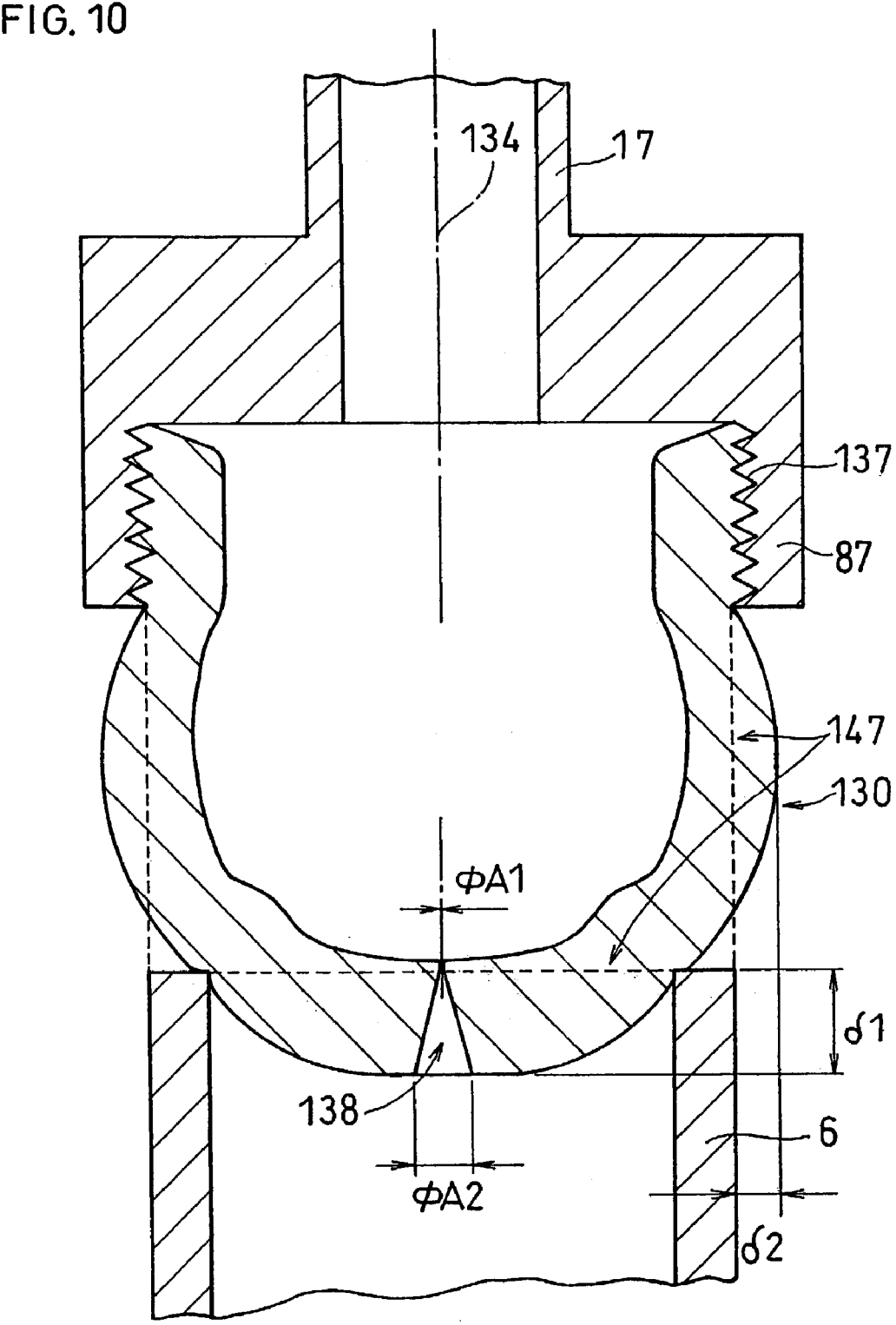
FIG. 10 is a longitudinal sectional view of the crucible of FIG. 9 after it was used in an experiment of dropping a melt.

FIG. 9 is a longitudinal sectional view of the crucible made of quartz glass incorporated in the apparatus of FIG. 8. FIG. 10 is a longitudinal sectional view of the crucible of FIG. 9 after it was used in an experiment of melting a raw material and dropping the stored melt. In FIG. 9, a crucible 120 made of quartz glass has a circular section perpendicular to an axis line 134. The inner surface of the crucible is in contact with a melt 3, and comprises a cylindrical part 132 and a conical part 133. At its bottom, a nozzle 138 (the internal diameter of the nozzle is represented by $\phi A$) is formed on the same axis as the axis line 134. An external thread part 137 formed at the upper outer face of the crucible 120 is screwed into the crucible mounting member 87 of the gas supply pipe 17.

In FIG. 10, a broken line 147 represents the portions corresponding to the outer face and bottom of the crucible 120 before use. An after-use crucible 130 made of quartz glass is deformed such that its outer face is swollen outward (the amount of outer deformation is represented by $\delta 2$) and its bottom sags down (the amount of bottom deformation is represented by $\delta 1$). Due to the deformations, the nozzle 138 is deformed such that its upper internal diameter $\theta A1$ is significantly smaller than before use and its lower internal diameter $\theta A2$ is larger. Such deformations are ascribed to the fact that the weight of the crucible and the melt and the pressure of the pressurization gas were applied as loads onto the quartz glass crucible whose viscosity lowered significantly under high temperatures.

The crucible in the second production method and apparatus of the present invention takes advantages of the above-mentioned excellent characteristics of the quartz glass while substantially solving the above-described problem of decreased viscosity of the quartz glass crucible at high temperatures (hereinafter referred to as softening). That is, the present invention makes it possible to produce spherical particles of a semiconductor or metal having high melting point by using the crucible that is made of quartz glass at least near the nozzle and has the heat-resistant support member for suppressing the deformation of the quartz glass at high temperatures in combination with the inert gas for pressurization such as Ar.

Figure 11:
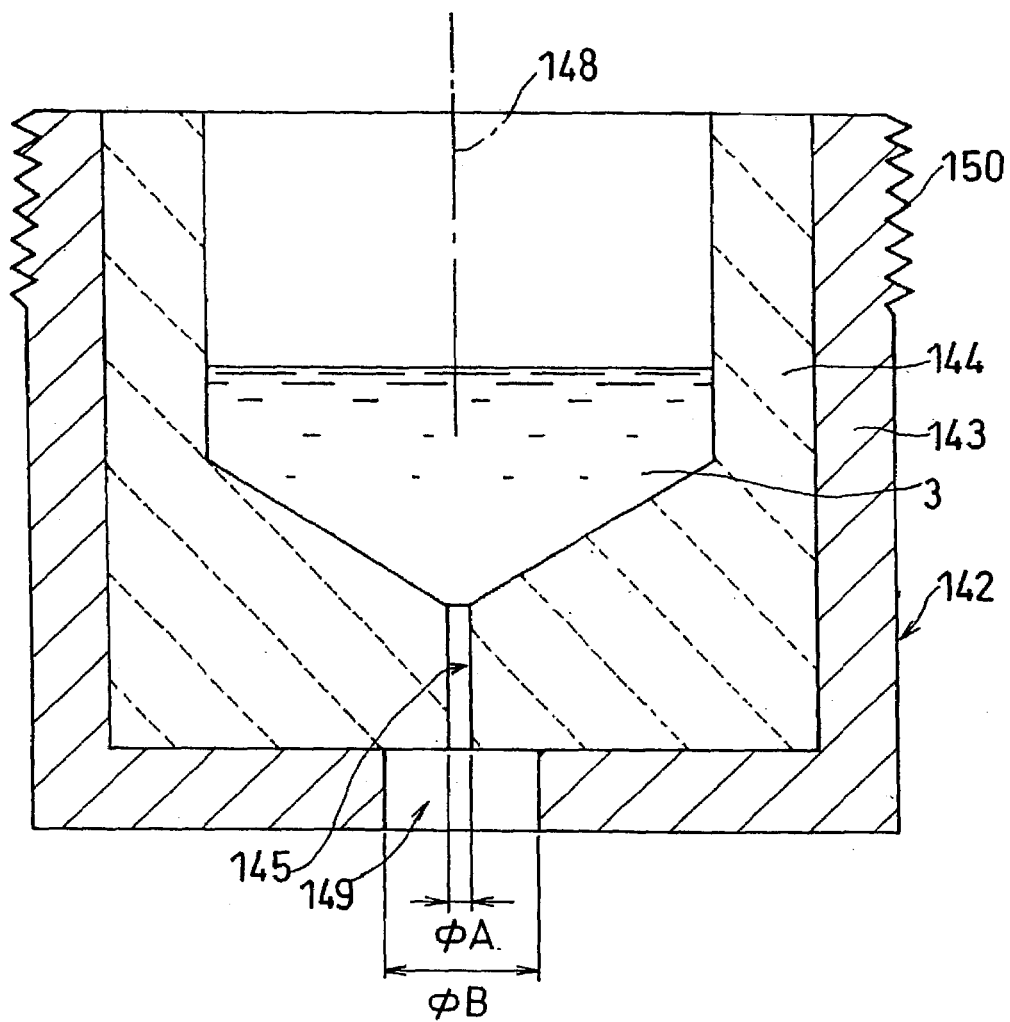
FIG. 11 is a longitudinal sectional view of a crucible in a sixth embodiment of the present invention.

In the following, crucibles in sixth to eleventh embodiments of the present invention are specifically described with reference to FIGS. 11 to 18. FIG. 11 is a longitudinal sectional view of a crucible in a sixth embodiment. The crucible comprises a crucible body which is made of quartz glass and which has a nozzle at its bottom and a support member for supporting the outer side faces and bottom of the crucible body except at least near the nozzle. The inner face of a crucible body 144 to come in contact with a melt 3 stored in a crucible 142 is inclined and tapered down toward the upper part of a nozzle 145. A support member 143 is a bottomed cylinder and has an opening 149 at its bottom. The opening 149 is formed on the same axis as an axis line 148 and has a greater internal diameter than the nozzle 145.

The crucible 142 is constituted by fitting the crucible body 144 into the support member 143. An external thread part 150 formed at the upper outer face of the support member 143 is screwed into the crucible mounting member 87 of the gas supply pipe 17 of the apparatus of FIG. 8. The crucible 142 is so configured as to be detachable from the crucible mounting member 87 for replacement.

In order not to hinder the dropping of a melt 3, the diameter $\phi B$ of the opening 149 of the support member is preferably greater than the internal diameter $\phi A$ of the nozzle 145 by 0.1 to 20 mm, and more preferably by 0.1 to 5 mm. $\phi A$ is preferably from 0.05 to 2.0 mm. If the difference between $\phi B$ and $\phi A$ is less than 0.1 mm, the melt dropped from the nozzle tends to contact or adhere to the inner walls of the opening. The adhered melt hampers the subsequent dropping of the melt. If $\phi B$ is greater than $\phi A$ by more than 20 mm, the softened part of the crucible body around the nozzle is not sufficiently supported by the support member. Thus, the quartz glass around the nozzle undergoes major deformation, thereby narrowing or closing the nozzle.

Figure 12:
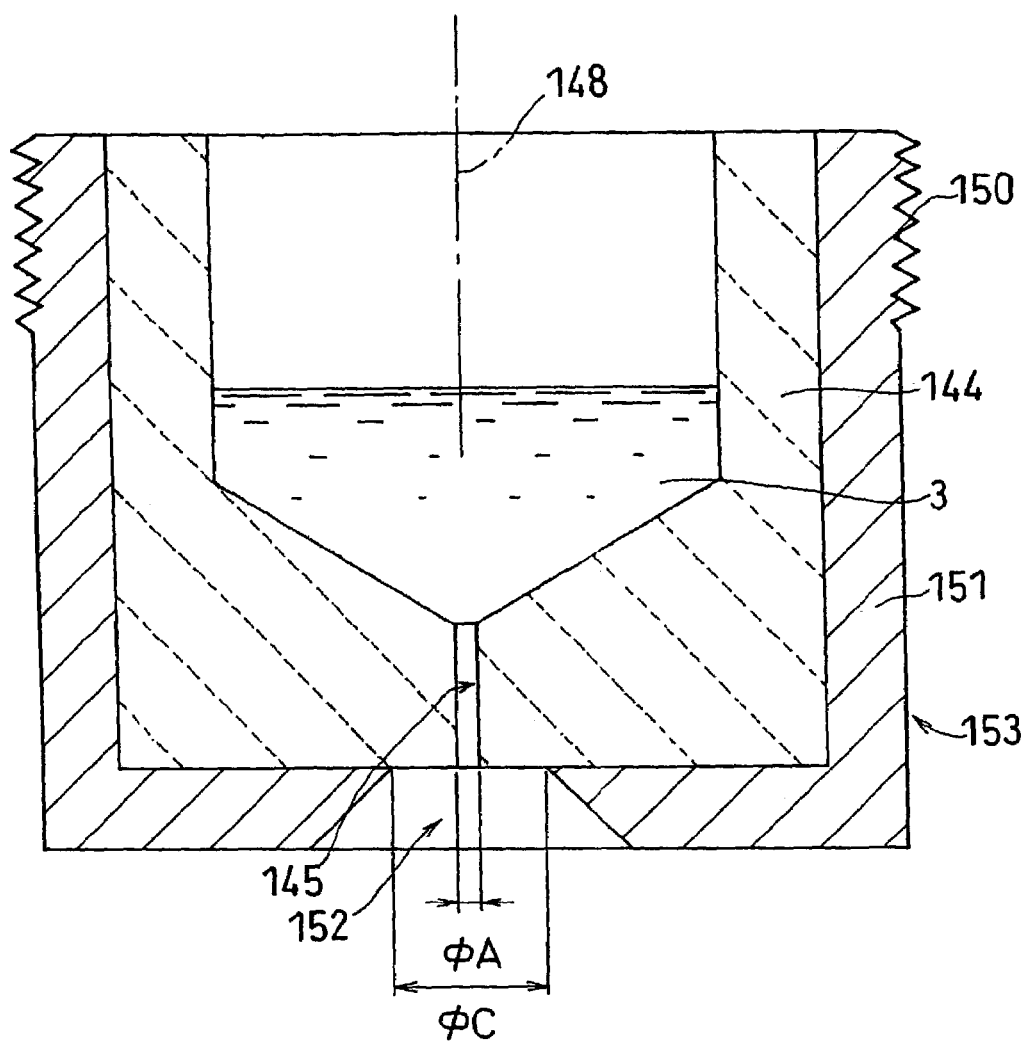
FIG. 12 is a longitudinal sectional view of a crucible in a seventh embodiment of the present invention.

FIG. 12 is a longitudinal sectional view of a crucible in a seventh embodiment. Whereas the support member 143 of the crucible 142 of FIG. 11 has the opening 149 of which diameter is vertically the same, a support member 151 of a crucible 153 of FIG. 12 has an opening 152 of which diameter becomes greater in a downward direction. Except for this opening, the crucible 153 of FIG. 12 has the same structure as the crucible 142 of FIG. 11.

The formation of the opening 152 effectively prevents a melt 3 dropped from a nozzle 145 from contacting or adhering to the inner walls of the opening 152 of the support member 151, so that the melt can be dropped more smoothly. In the same manner as the relation between $\phi B$ and $\phi A$ of FIG. 11, the upper diameter $\phi C$ of the opening 152 is preferably greater than the internal diameter $\phi A$ of the nozzle 145 by 0.1 to 20 mm, and more preferably by 0.1 to 5 mm.

Figure 13:
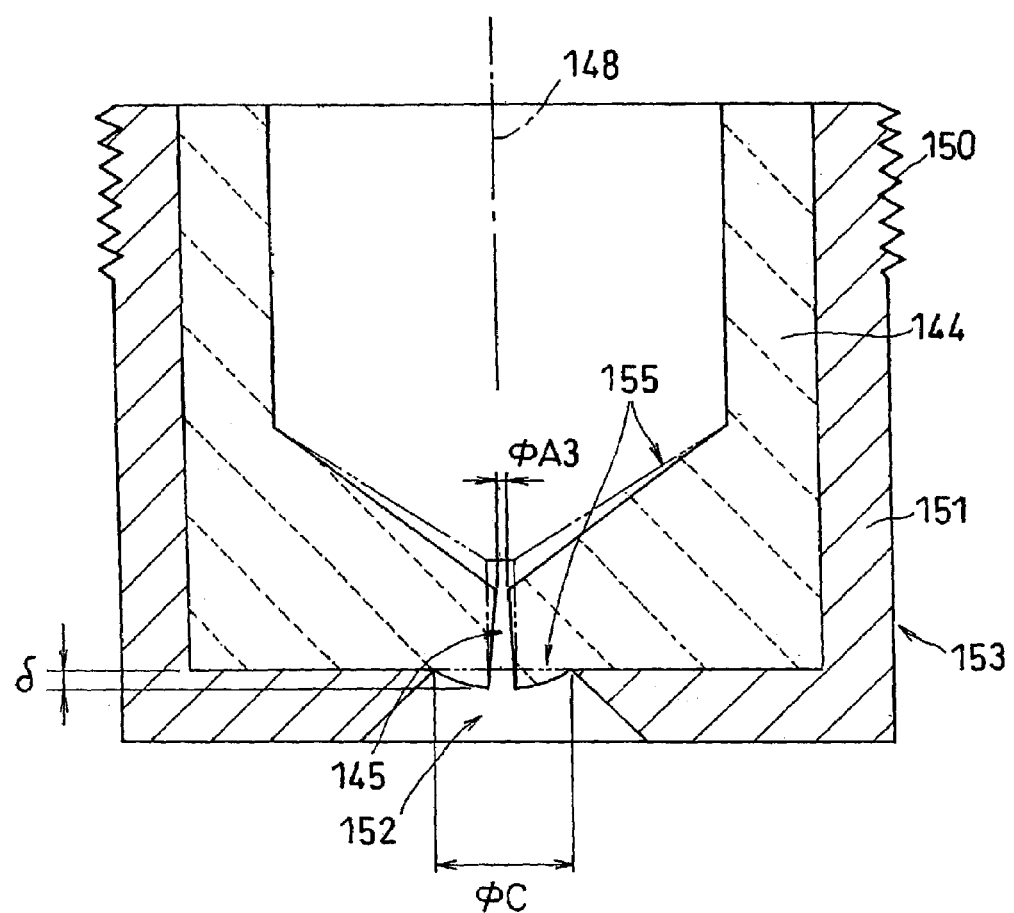
FIG. 13 is a longitudinal sectional view of the crucible of FIG. 12 after it was used in an experiment of dropping a melt.

FIG. 13 is a longitudinal sectional view of the crucible of FIG. 12 after it was used in an experiment of melting a raw material and dropping the stored melt. In FIG. 13, a broken line 155 represents the portions corresponding to the outer face and bottom of the crucible before use. Since the outer face of the crucible is wholly supported by the support member 151, no deformations are found after use. At the bottom of the crucible 153, the part directly contacting the support member 151 is free from deformation, but the circumferential part of the nozzle 145 exposed to outside from the opening 152 is slightly deformed. Thus, the nozzle 145 is deformed such that its upper internal diameter $\theta A3$ is slightly smaller than before use and its lower internal diameter is slightly larger. The degree of this deformation of the nozzle is significantly small when compared to the case of the quartz glass crucible 130 of FIG. 10, and hence this deformation does not substantially hinder the smooth dropping of the melt from the nozzle.

The crucible of the present invention may be made of quartz glass at least near the nozzle and have a support member which is made of a heat-resistant material and which also serves as the crucible body. For example, as illustrated in FIGS. 14 to 18, a crucible may comprise: a crucible body which has a mounting hole at its bottom and also serves as a support member; and a nozzle member mounted on the mounting hole, the nozzle member having a nozzle and being made of quartz glass. A crucible body also serving as a support member is hereinafter referred to as a "crucible body-support member." As the heat-resistant material, the same material as the material of the support member of the crucible of FIGS. 11 and 12 may be used. The nozzle member may be worked in a similar manner to the crucible body of the crucible of FIGS. 11 and 12.

Figure 14:
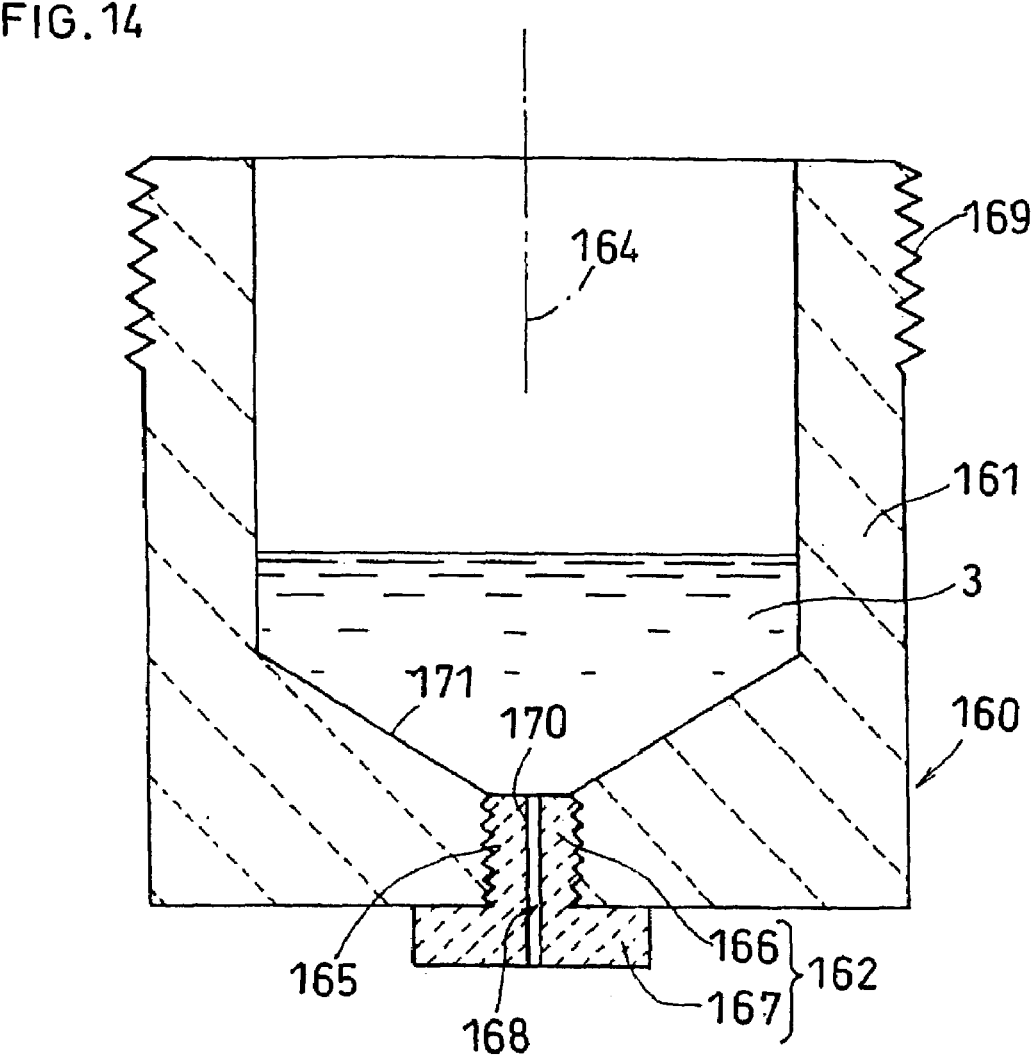
FIG. 14 is a longitudinal sectional view of a crucible in an eighth embodiment of the present invention.

FIG. 14 is a longitudinal sectional view of a crucible in an eighth embodiment. A crucible 160 comprises a crucible body-support member 161 having a mounting hole 165 at its bottom. The mounting hole 165 has an internal thread and is formed on the same axis as an axis line 164. A nozzle member 162 comprises an external thread part 166 and a base part 167. The external thread part 166 is screwed into the mounting hole 165 so that the nozzle member 162 can be exchanged.

The nozzle member 162 has a nozzle 168 that is formed on the same axis as the axis line 164. The base part 167 is in contact with the lower face of the bottom of the crucible body-support member 161, and an upper part 170 of the nozzle 168 is joined to the lower part of a conical part 171. An external thread part 169 formed on the upper outer face of the crucible body-support member 161 is screwed into the crucible mounting member 87 of the gas supply pipe 17 of the apparatus of FIG. 8. The crucible body-support member 161 is so configured as to be detachable from the crucible mounting member 87.

Figure 15:
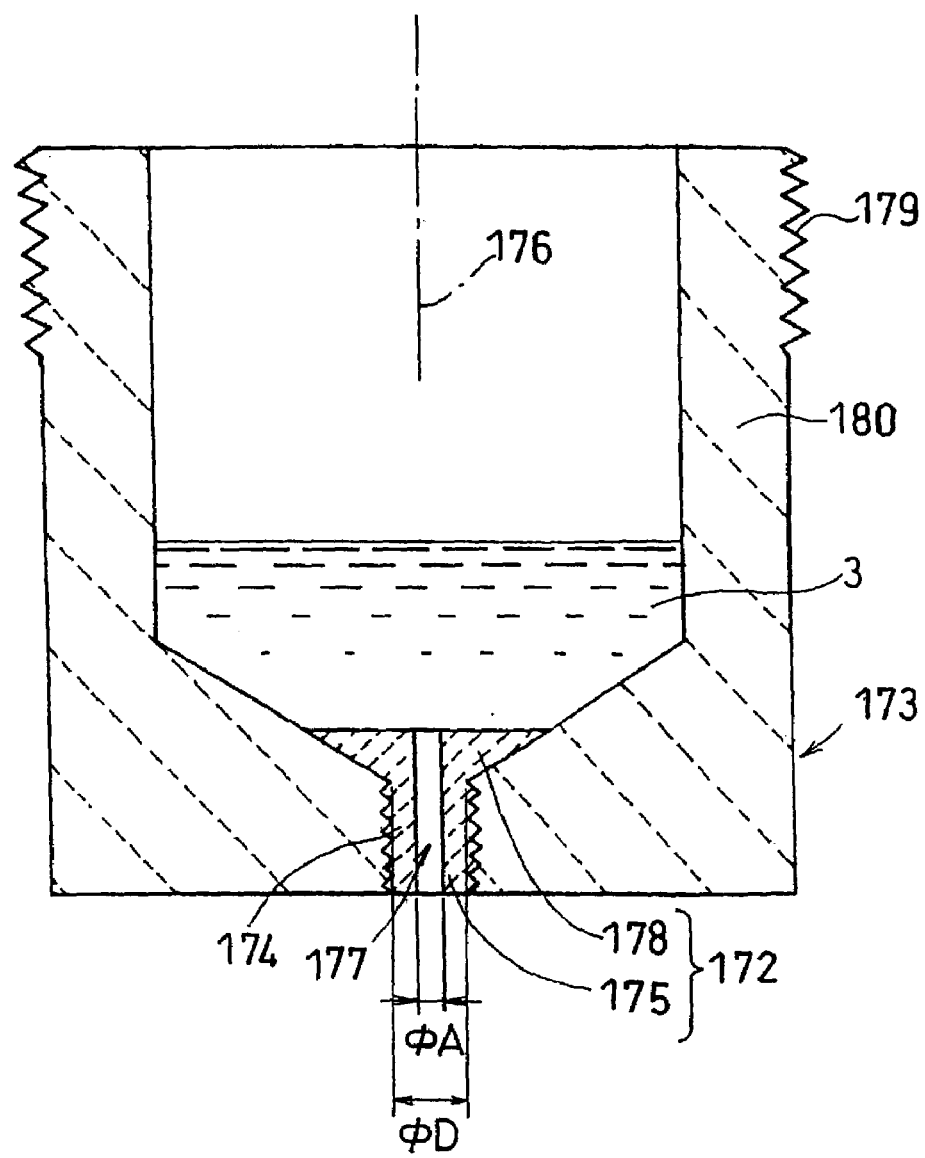
FIG. 15 is a longitudinal sectional view of a crucible in a ninth Embodiment of the present invention.

FIG. 15 is a longitudinal sectional view of a crucible in a ninth embodiment. A crucible body-support member 180 of a crucible 173 has the same structure as that of the crucible body-support member 161 in FIG. 14, with a mounting hole 174 formed at its bottom. A nozzle member 172 comprises an external thread part 175 screwed into an internal thread of the mounting hole 174 and a top part 178. The nozzle member 172 also has a nozzle 177 that is formed on the same axis as an axis line 176. The top part 178 is joined to a conical part of the crucible body-support member 180. The crucible body-support member 180 and the nozzle member 172 are made of the same material as in FIG. 14. An external thread part 179 formed on the upper outer face of the crucible body-support member 180 is screwed into the crucible mounting member 87 of the gas supply pipe 17 of the apparatus of FIG. 8.

In FIG. 15, φD represents the outer diameter of the part of the nozzle member to be screwed into the mounting hole, i.e., the root diameter of the external thread, and φA represents the internal diameter of the nozzle. By making φD greater than φA by 0.1 to 20 mm in the crucibles of FIGS. 14 and 15, the nozzle member is firmly supported by the crucible body-support member owing to the engagement of the external thread part of the nozzle member with the internal thread part of the crucible body-support member. Accordingly, even if the nozzle member made of quartz glass is softened, it can be retained in a secure mounting state, and the deformation or closing of the nozzle can be prevented. Further, such crucibles comprising a crucible body-support member and a nozzle member as in FIGS. 14 and 15 allow a reduction in the amount of expensive quartz glass and therefore have an advantage of being inexpensive in producing crucibles.

Figure 16:
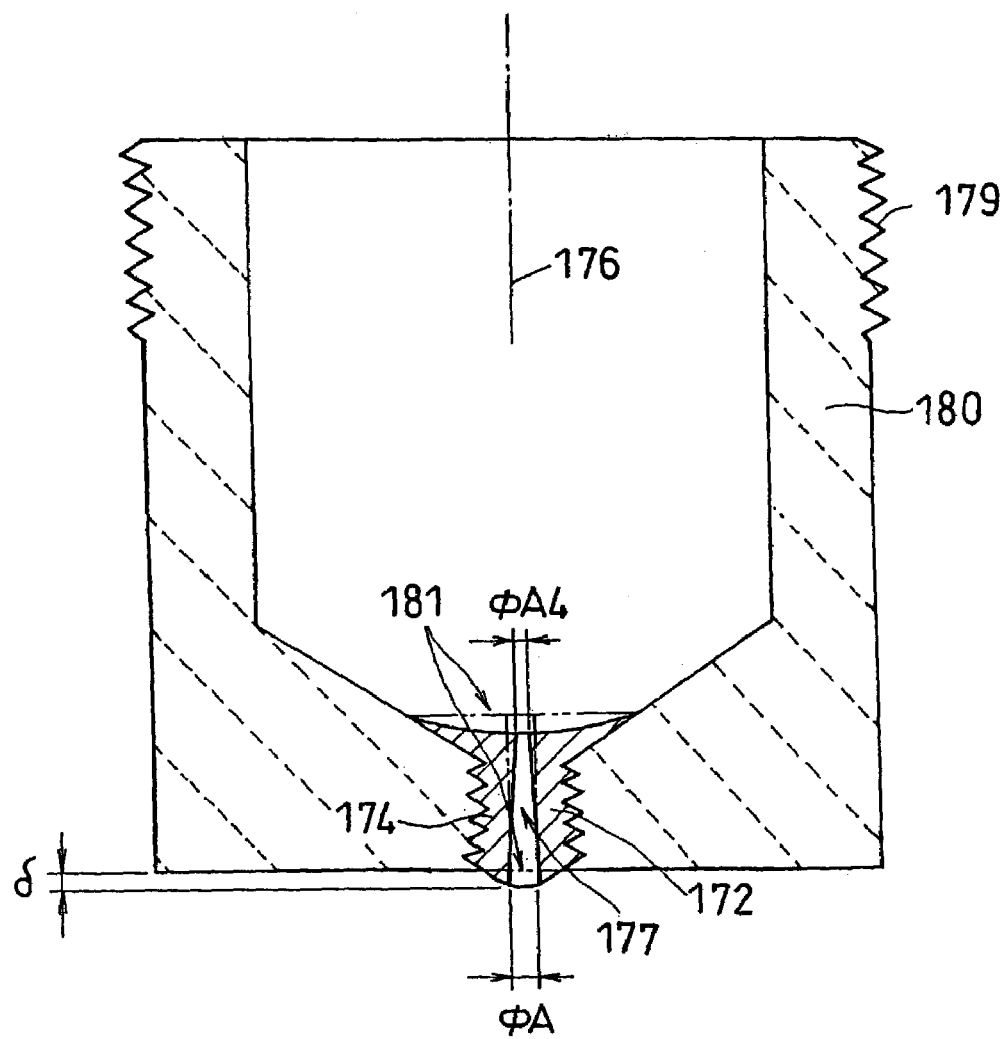
FIG. 16 is a longitudinal sectional view of the crucible of FIG. 15 after it was used in an experiment of dropping a melt.

FIG. 16 is a longitudinal sectional view of the crucible of FIG. 15 after it was used in an experiment of melting a raw material and dropping the stored melt. A broken line 181 represents the portions corresponding to the upper face and bottom of the nozzle member 172 of the crucible before use. The nozzle member 172 is slightly deformed downward. The nozzle 177 is deformed such that its upper internal diameter φA4 is slightly smaller than before use and its lower internal diameter is slightly larger. However, the degree of this deformation is significantly small when compared to the case of the quartz glass crucible 130 of FIG. 10, and hence this deformation does not substantially hinder the smooth dropping of the melt from the nozzle.

As the outer diameters of the nozzle members of the crucibles of FIGS. 14 and 15 become greater, the nozzle members are more likely to sag down when the nozzle members fixed to the crucible body-support members become softened and deformed at high temperatures. If the outer diameter φD of the nozzle member is greater than the internal diameter φA of the nozzle, for example, by more than 20 mm, the deformation of the nozzle member may narrow the nozzle to a practically not negligible extent.

When the outer diameter of the nozzle member is large as described above, it is preferable that the crucibles of FIGS. 14 and 15 comprise another supporting member (second support member) for supporting at least the bottom of the crucible body-support member (first support member) and the bottom of the nozzle member except near the nozzle. As the material of the second support member, it is possible to use the same heat-resistant material as the material of the first support member.

Figure 17:
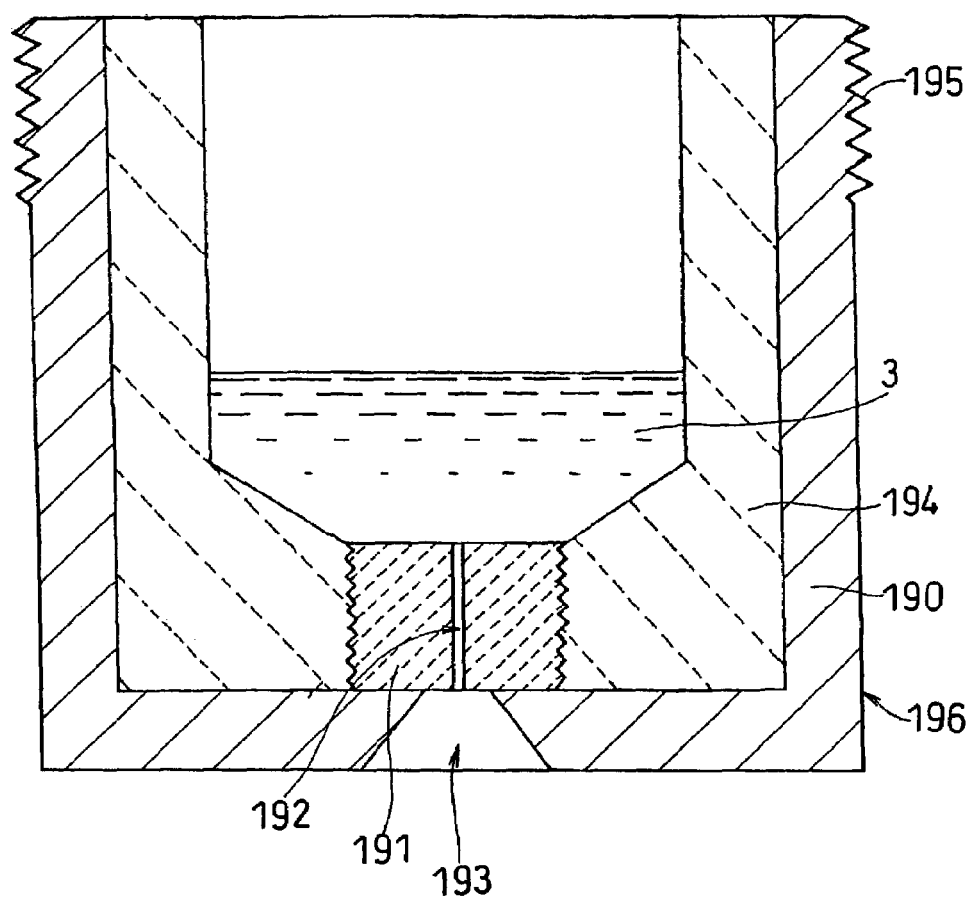
FIG. 17 is a longitudinal sectional view of a crucible in a tenth embodiment of the present invention.

FIG. 17 is a longitudinal sectional view of such a crucible, which is a tenth embodiment. A crucible 196 uses a nozzle member 191 having a large outer diameter and is constituted by fitting a crucible similar to the one of FIG. 15 into a second support member 190 which is a bottomed cylinder. The second support member 190 of the crucible 196 has, at its bottom, an opening 193 which is formed on the same axis as the axis of a nozzle 192 and which has a diameter smaller than the outer diameter of the nozzle member 191 but greater than the internal diameter of the nozzle 192. The second support member 190 is disposed so as to surround the outer side faces and bottom of the first support member 194 and the nozzle member 191 except near the nozzle 192.

Accordingly, even if the nozzle member is softened at high temperatures, the mounting strength of the nozzle member onto the first support member is retained, and the sagging of the nozzle member and the deformation of the nozzle caused thereby are effectively suppressed. An external thread part 195 formed on the upper outer face of the second support member 190 is screwed into the crucible mounting member 87 of the gas supply pipe 17 of the apparatus of FIG. 8.

As for the crucibles 160, 173 and 196 of the eighth to tenth embodiments, the heat-resistant material used as the material of the crucible body-support member may not be necessarily sufficient in terms of non-wettability and chemical stability with respect to the melt. In such cases, there is a fear that the contact of the heat-resistant material with the melt in the crucible causes impurities to be included into the melt or hinders the smooth flow of the melt into the nozzle.

In order to eliminate this fear, it is effective to form a coating layer comprising quartz glass on the inner surface of the crucible body-support member at least at its part to come in contact with the melt. The coating layer may be formed so as to have a thickness of 0.1 to 5 μm, for example, by CVD or PVD. The coating layer may be formed by applying a paste containing powdery quartz glass onto a crucible body-support member and subjecting it to a thermal treatment.

Figure 18:
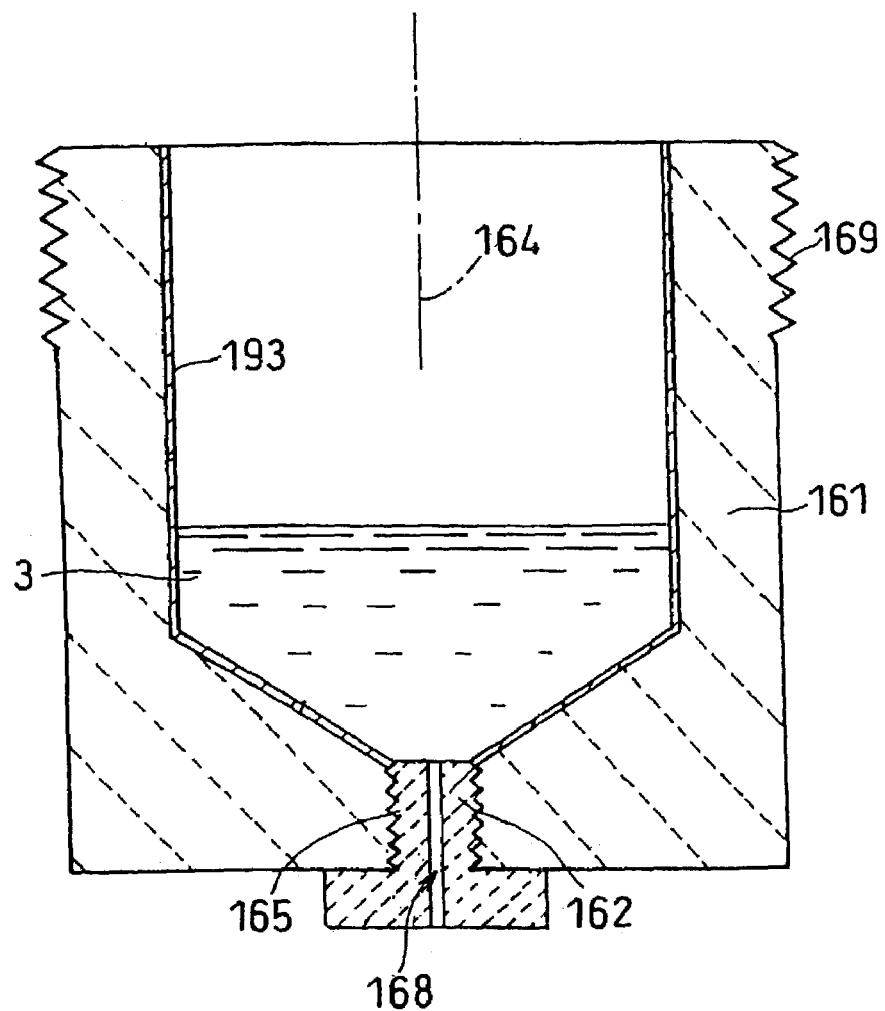
FIG. 18 is a longitudinal sectional view of a crucible in an eleventh embodiment of the present invention.

FIG. 18 is a longitudinal sectional view of a crucible in an eleventh embodiment in which a coating layer comprising quartz glass is formed on the inner surface of the crucible of FIG. 14. A coating layer 193 is formed on the inner surface of the part of the crucible body-support member 161 to store the melt 3, i.e., the cylindrical part and the conical part. This prevents the reaction of the melt with the crucible body, eliminates the inclusion of impurities into the melt and enables the smooth flow of the melt into the nozzle.

In the sixth to eleventh embodiments according to the second production method and apparatus of the present invention, the material of the crucible at least near the nozzle may be transparent quartz glass, opaque quartz glass or synthetic quartz glass. Transparent quartz glass is produced by melting natural crystal, while opaque quartz glass is manufactured by melting natural silica. They are sometimes called molten quartz glass. Synthetic quartz glass is referred to as ultra-pure quartz glass and is produced from a raw material such as $SiCl_4$ by CVD or the like.

These quartz glasses have essential properties such as chemical stability, non-wettability and thermal resistance as the materials of the crucible used for producing spherical particles, except that they are susceptible to softening at high temperatures. Further, since quartz glass generally has high purity, it is also a preferable material in terms of eliminating the possible inclusion of impurities into the melt. Quartz glass typically includes metal impurities such as Al, Fe, Na, Cu and B, and has an extremely low impurity concentration of approximately 1 to 10 ppm for molten quartz glass and 1 to 10 ppb for synthetic quartz glass.

When the content of hydroxyl groups (OH groups) is higher, quartz glass has a lower viscosity and is therefore more likely to become softened. The content of OH groups in quartz glass varies from less than 1 ppm to approximately 1000 ppm. In the present invention, it is preferable to use quartz glass whose content of OH groups is as low as possible. For example, transparent quartz glass, which is produced by melting natural crystal in a vacuum or an inert gas, generally exhibits a low content of OH groups, namely 5 ppm or lower. Further, synthetic quartz glass, which is produced by converting $SiCl_4$ gas into $SiO_2$ in plasma flame of oxygen gas containing no water, and synthetic quartz glass, which is manufactured from a raw material such as $SiCl_4$ or $SiH_4$ and $H_2O$ by CVD, exhibit an extremely low OH-group content of 1 ppm or less. From this viewpoint, quartz glass to be used in the present invention is preferably any one of these three kinds of quartz glass, particularly synthetic quartz glass.

By using the crucible of the present invention represented by the first to eleventh embodiments of the present invention in combination with the inert pressurization gas of the present invention, the melt can be dropped from the nozzle in a stable and continuous manner without closing the nozzle. These effects make it possible to produce, from a semiconductor or metal having high melting point and high reactivity, high-purity spherical particles having uniform particle size distribution with good productivity.

Figure 2:
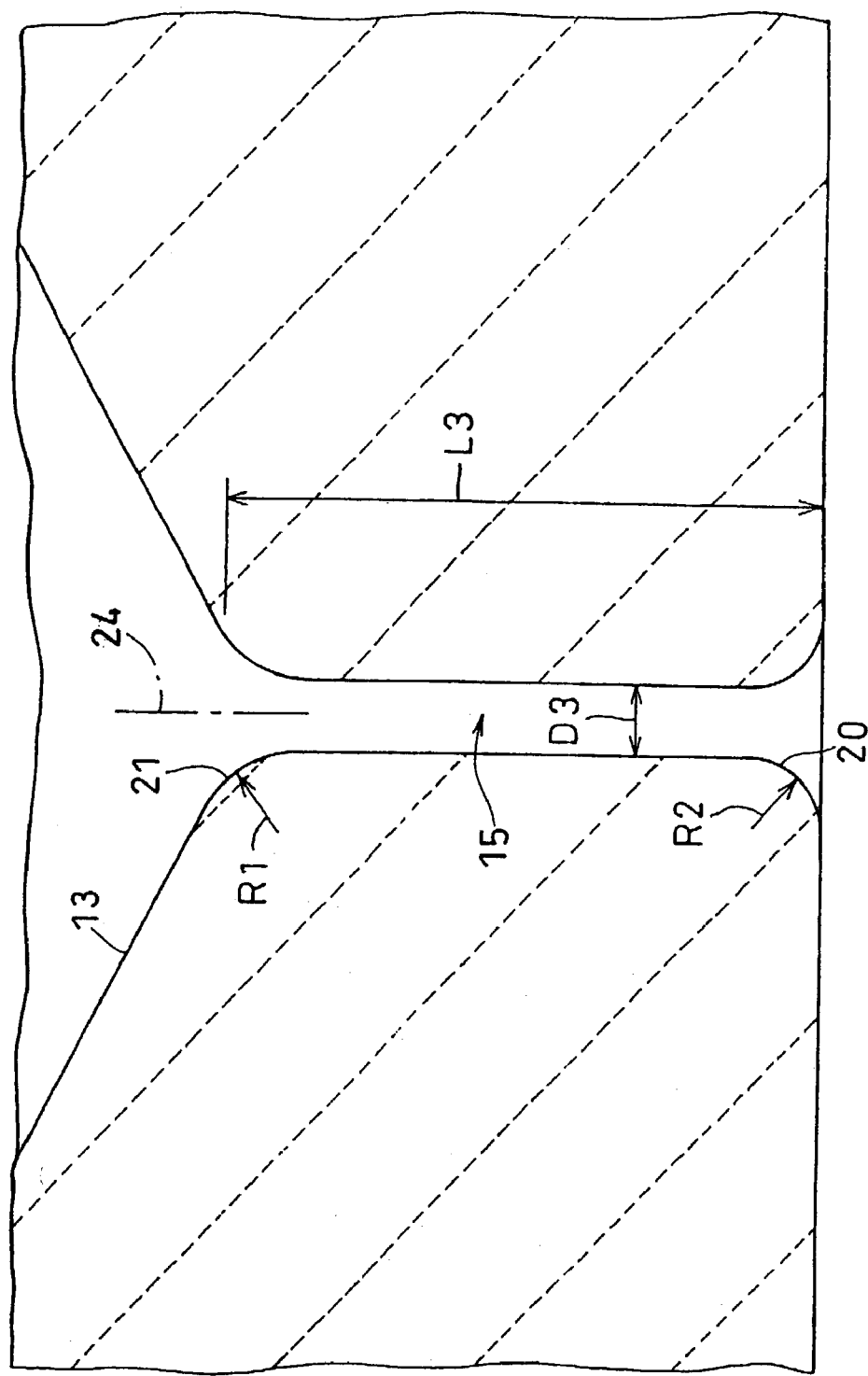
FIG. 2 is an enlarged longitudinal sectional view of a nozzle and its vicinity of the crucible of FIG. 1.

The crucibles of the present invention represented by the first to eleventh embodiments are detailed more specifically with reference to FIG. 2. FIG. 2 is an enlarged view of the nozzle and its vicinity of the crucible 14 of FIG. 1.

The internal diameter D3 of the nozzle 15 is from 0.05 to 2.0 mm, and the length L3 from an upper opening end 21 to a lower opening end 20 is preferably 1 to 50 times the internal diameter of the nozzle. This enables mass production of spherical particles having uniform particle size.

If the internal diameter of the nozzle is less than 0.05 mm, the spherical particles produced are too small, and therefore, difficult to handle. If the internal diameter of the nozzle is greater than 2.0 mm, the spherical particles produced are too large, thereby lowering the photoelectric conversion efficiency per unit area when used, for example, as photoelectric conversion elements or their bases. For photoelectric conversion element applications, the spherical particles preferably have a particle size of around 1 mm in view of the power generation efficiency, and the internal diameter of the nozzle for producing such particles is preferably from 0.1 to 0.5 mm.

The length L3 of the nozzle 15 is preferably from 1 to 50 times the internal diameter of the nozzle as described above, and more preferably 10 to 20 times. The length may be, for example, from 0.05 to 60 mm, and preferably 10 to 20 mm. If the length of the nozzle is less than the internal diameter of the nozzle, the melt flowing through the nozzle does not become a laminar flow but becomes a turbulent flow having a large Reynolds number, so that the size of the dropping melt particles becomes uneven. When the length of the nozzle is 50 times the internal diameter of the nozzle, it is long enough to make the size of the spherical particles uniform. If the length is more than 50 times, it is difficult to drill a hole in the nozzle.

As described above, the optimization of the length and internal diameter of the nozzle prevents the melt inside the crucible from dropping from the nozzle merely under its own weight, so that the flow rate of the melt dropped from the nozzle can be controlled by means of the pressure applied by the pressurizing means. This enables production of spherical particles having excellent characteristics such as particle size distribution.

In the present invention, the upper opening end 21 of the nozzle 15 is preferably curved so that the internal diameter of the nozzle becomes greater. The curvature radius R1 of the upper opening end 21 of the nozzle 15 is preferably ⅒ to 10 times the internal diameter D3 of the nozzle 15, and more preferably 1 to 5 times. In this way, by shaping the upper opening end of the nozzle like a trumpet, the melt can be introduced into the nozzle smoothly, and the melt can be dropped efficiently from the nozzle in the form of a laminar flow.

Also, the lower opening end 20 of the nozzle 15 is preferably curved so that the internal diameter of the nozzle becomes greater. By shaping the lower opening end of the nozzle like a trumpet, the phenomenon of the melt increasingly adhering to the lower part of the nozzle with the passage of time is suppressed. This reduces the fear that the adhered melt clogs the lower part of the nozzle and therefore facilitates the continuous dropping of the melt.

Further, the bottom of the inner face of the crucible is preferably inclined and tapered down toward the upper opening end 21 of the nozzle 15. Accordingly, the melt in the crucible is guided to the upper part of the nozzle along the bottom of the inner face of the crucible, so that all the melt can be ultimately introduced into the nozzle without wastefully leaving the melt in the crucible.

In the production method and apparatus of the present invention, the pressure P1 of the gas supplied to the space over the melt in the crucible is preferably higher than the pressure P2 of the gaseous phase into which the melt is dropped by 1 to 100 kPa. In this case, the melt being dropped from the nozzle receives the pressure which is the sum of the pressure difference between P1 and P2 and the pressure of the weight of the melt stored over the nozzle. The pressure difference between P1 and P2 is hereinafter referred to as "pressure difference".

If the pressure difference is less than 1 kPa, the melt does not drop smoothly from the nozzle, so the pressure difference is preferably 1 kPa or more, and more preferably 5 kPa or more. If the pressure difference is more than 100 kPa, the structures of the crucible and the gas pressurizing unit become complicated, so the pressure difference is preferably 100 kPa or less, and more preferably 50 kPa or less.

In the first production method and apparatus of the present invention, the crucible is, at least near the nozzle, made of a material comprising at least one of hexagonal BN, cubic BN, $Si_3N_4$, $TiB_2$, $ZrB_2$, zirconia and stabilized zirconia, which have low wettability and low reactivity with respect to a high temperature melt and have high thermal resistance.

In the second production method and apparatus of the present invention, the crucible is, at least near the nozzle, made of quartz glass, of which wettability and reactivity are extremely low with respect to a high temperature melt. The crucible further has a support member that effectively suppresses the deformation and closing of the nozzle when the quartz glass is exposed to high temperatures and becomes softened. In addition, in the present invention, such crucible is used in combination with the pressurization gas of the inert gas which is unreactive to a high temperature melt.

For these reasons, the present invention is particularly effective in producing spherical particles of a semiconductor or metal which has a high melting point of not less than 1000° C. and of which melt easily reacts with the crucible material and the pressurization gas. Examples of the semiconductor or metal having a high melting point of not less than 1000° C. to which the present invention is effectively applicable include Si, GaAs, InGaP, titanium, chromium, copper, iron, manganese, tangsten, molybdenum and tantalum. The present invention is also applicable to the production of spherical particles of highly reactive metals having a melting point of not more than 1000° C. such as magnesium, aluminum and zinc.

Among these semiconductors and metals, the application of the present invention to the production of Si spherical particles is most effective. This is because Si is a semiconductor which has a high melting point of 1410° C. and high reactivity and is particularly liable to produce silicides, and it is therefore difficult, with prior art techniques, to produce high-purity Si particles with good productivity. The present invention facilitates the production of Si spherical particles having high purity, thereby making it possible to meet the intense need for spherical semiconductor particles in the fields of solar cells and semiconductors.

Figure 19:
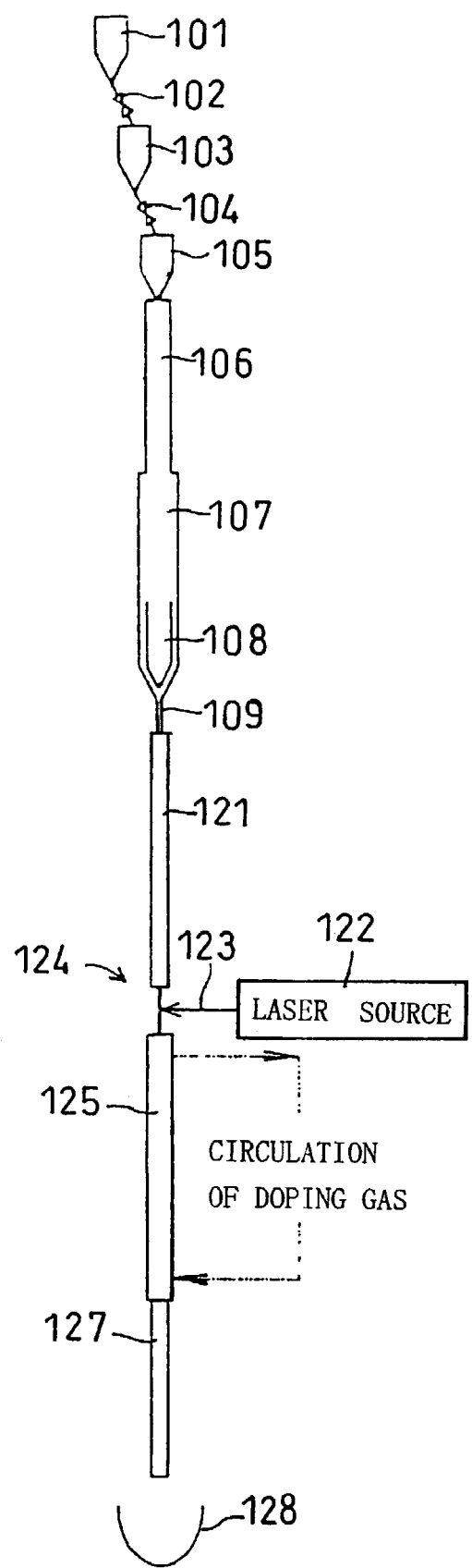
FIG. 19 is a schematic view illustrating the whole constitution of a production apparatus in one embodiment of the present invention.

FIG. 19 is a schematic view showing a simplified whole constitution of a production apparatus of spherical particles in one embodiment of the present invention. This apparatus is an apparatus for producing spherical Si semiconductor particles used for photovoltaic apparatus and the like. First, a granular Si p-type semiconductor material is fed into an upper hopper 101, and then fed into a middle hopper 103 through an open/close valve 102. From the middle hopper 103, the material is fed into a lower hopper 105 though an open/close valve 104.

The material from the lower hopper 105 is preheated at a solid preheating section 106 and is heated and melted at a melting section 107. The melting section 107 includes a crucible 108 where the melt of Si is stored. An inert gas for pressurization is supplied into the space over the melt in the crucible 108, and at the same time, the melt is vibrated. The melt is dropped from the outlet of a nozzle 109 at the bottom of the crucible 108 at a predetermined flow rate corresponding to the pressure of the inert gas for pressurization. The gaseous phase into which the melt is dropped is an Ar atmosphere at atmospheric atmosphere.

In another embodiment, the pressure of the space over the melt in the crucible may be atmospheric pressure, and the pressure of the gaseous phase into which the melt is dropped may be lower than atmospheric pressure. The preferable atmosphere of the gaseous phase may be formed of a gas comprising at least one selected from the group consisting of He, Ne, Ar, Kr and Xe besides the above-mentioned gas consisting singly of Ar.

The melt dropped from the outlet of the nozzle 109 changes its shape into particles. As the particles pass through a cooling cylinder 121, their sphericity increases and their surfaces are smoothed, and they become solid spherical particles, Further, the spherical particles are classified. In this way, p-type spherical semiconductor particles are produced by the above-described apparatus. The production apparatus as described above may be one embodiment of the present invention, but this production apparatus may be connected with an apparatus for crystallizing and classifying the spherical particles.

In this case, the classified spherical particles are, in a gaseous phase, illuminated with laser light 123 emitted from a laser source 122, so that they are heated and re-melted to become single-crystal or polycrystalline. Accordingly, the particles are prevented from becoming cracked on their surfaces or amorphous. Such spherical particles are classified, and spherical particles of p-type crystalline semiconductor are produced.

The production apparatus as described above may be further connected with an apparatus for forming an n-type semiconductor layer on the surface of each of the spherical particles of p-type crystalline semiconductor. In this case, the p-type semiconductor particles are first introduced into a surface layer forming means 125. In the surface layer forming means 125, these particles are passed through a passage in a gaseous phase which contains diffusion source atoms or molecules with which the surfaces of the particles are to be doped, in order to form an n-type semiconductor layer on each of the spherical particles of p-type crystalline semiconductor.

This passage is formed so as to extend vertically, and surface layer diffusion occurs as the particles drop through the passage. As the diffusion source, for example, $P_2O_5$, $POCl_3$, $PH_3$ or the like is used. The particles each having a surface layer formed thereon are cooled in a cooling cylinder 127, and are then collected into a collection container. In this way, photoelectric conversion elements each of which has a desirable surface layer without any defects such as cracks and is excellent in crystallinity and sphericity are obtained.

Figure 20:
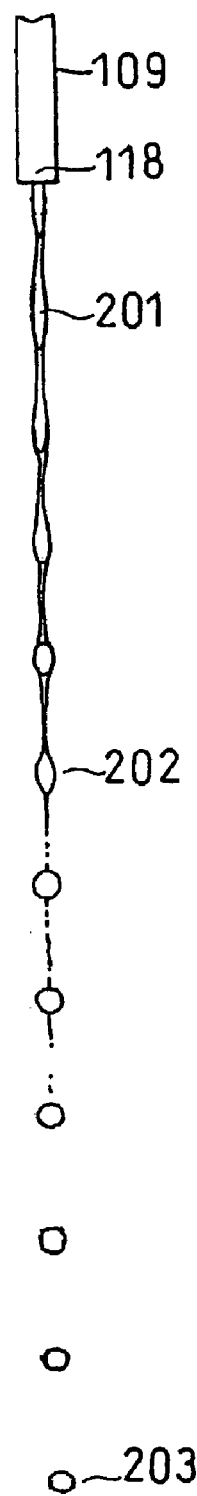
FIG. 20 is a schematic view illustrating the process of formation of spherical particles from a dropped melt.

FIG. 20 is a schematic view illustrating the process of formation of spherical particles from a melt dropped from the outlet of the nozzle. A melt 201 dropped from a nozzle outlet 118 is a continuous, vertical stream. As it drops, it becomes divided into particulate droplets 202, and the droplets become spherical solid particles 203 as they drop further.

In the above-described photoelectric conversion element, the n-type Si semiconductor layer is formed on the outer face of the spherical p-type semiconductor. Instead, a photoelectric conversion element may be produced, for example, by forming a layer of one conductivity type semiconductor selected from the group consisting of AlGaAs, CuInSe$_2$, Cu(InGa)Se$_2$, GaAs, AlGaP, CdTe or similar compound semiconductors on a spherical particle of the opposite conductivity type semiconductor selected from the group consisting of InAs, CuInSe$_2$, Cu(InGa)Se$_2$, CuInS, GaAs, InGaP, CdTe and the like.

The spherical photoelectric conversion elements produced by the production apparatus in the above-described embodiment may be used as solar cell elements for photovoltaic apparatus. A typical example of the photovoltaic apparatus is a micro concentrator-type spherical solar cell. As disclosed in Japanese Laid-Open Patent Publication No. 2002-164554, for example, this solar cell employs such a configuration that a single solar cell element is disposed in each of a plurality of recesses formed on a support. The solar cell element is illuminated with light which is concentrated four to six times by a reflecting mirror formed on the inner face of the recess in order to enhance the output per solar cell element.

This solar cell can be produced by the following steps. First, the bottom of the spherical photoelectric conversion element (solar cell element) produced by the production apparatus in the above-described embodiment is cut so that an opening of the n-type semiconductor layer is formed so as to expose part of the spherical p-type semiconductor. Subsequently, a first electrode is formed at the exposed part of the p-type semiconductor while a second electrode is formed on the outer periphery close to the opening of the n-type semiconductor layer. Thereafter, the solar cell element is disposed at a predetermined position of the support.

Figure 21:
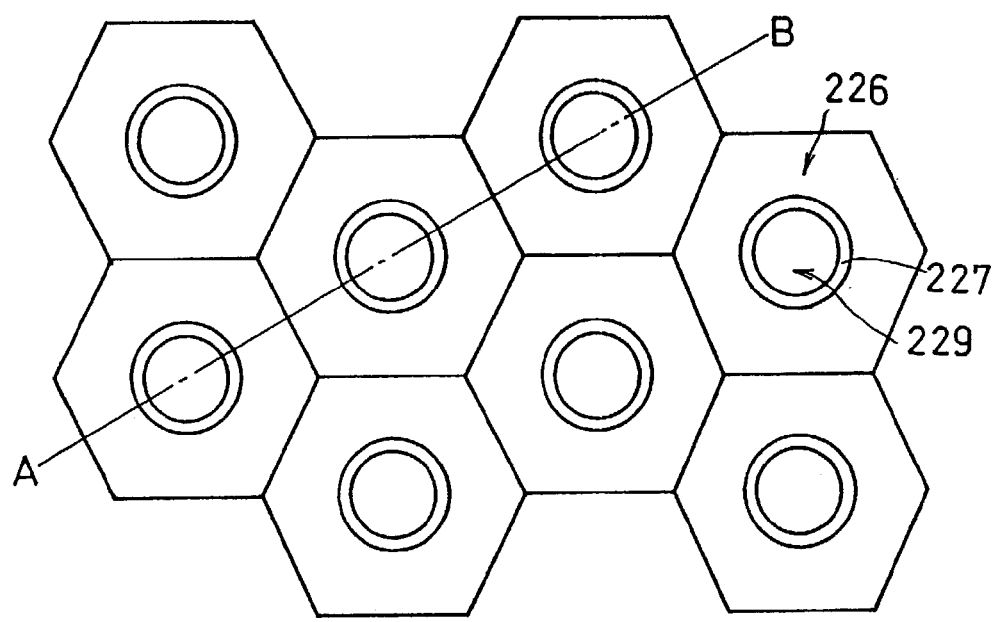
FIG. 21 is a plane view of a support of a solar cell comprising spherical photoelectric conversion elements produced by the production apparatus of FIG. 19.
Figure 22:
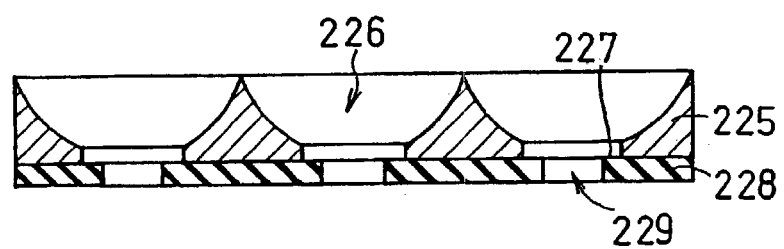
FIG. 22 is a sectional view of the support of FIG. 21 cut along line A–B of FIG. 21.

FIG. 21 is a partial plane view of a typical support, and FIG. 22 is a sectional view cut along A–B line of FIG. 21. The support comprises a second conductor layer 225 and an electrical insulator layer 228. The support has a plurality of recesses 226 which narrow toward the bottom. The opening of each recess 226 is a hexagon approximately 2.0 mm each side, and respective openings are adjacent to one another. A circular connection hole 229 is formed in the electrical insulator layer 228 in each recess, and the electrical insulator layer 228 is exposed at a circumferential part 227 of the connection hole 229. The inner face of the second conductor layer 225 functions as a conductor layer in electrical connection with the n-type semiconductor layer and as a reflecting mirror.

Figure 23:
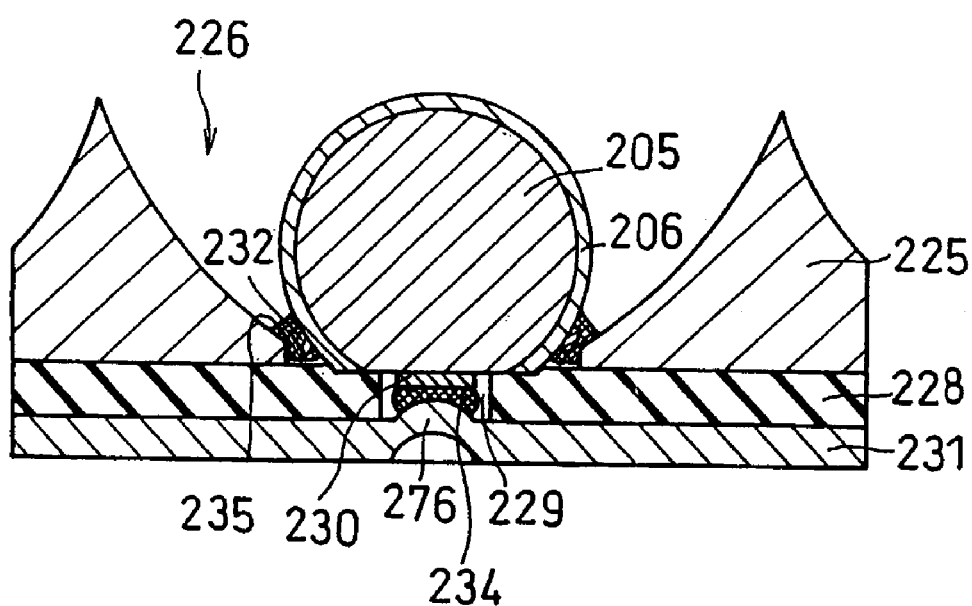
FIG. 23 is an enlarged longitudinal sectional view of the main part of the solar cell comprising spherical photoelectric conversion elements produced by the production apparatus of FIG. 19.

FIG. 23 is a longitudinal sectional view of a solar cell module incorporating the above-described solar cell element with an electrode formed on each of a p-type semiconductor 205 and an n-type semiconductor layer 206. The solar cell element is disposed in the recess 226 of the support of FIG. 21 such that its bottom is fitted into the connection hole 229. A first electrode 230 is connected to a projected part 276 of a first conductor layer 231 by solder 234, while a second electrode 232 is connected to the second conductor layer 225 at the bottom of the recess 226 of the support by solder 235. The bottom of the solar cell element is bonded to the electrical insulator layer 228 on the circumferential part of the connection hole 229.

Next, the present invention is described more specifically with reference to examples.

EXAMPLE 1

Using the apparatus of FIG. 7, an experiment of melting a raw material Si and dropping the melt into a gaseous phase was performed. A drop cylinder with a height of 7 m was attached to the apparatus of FIG. 7, and the melt was dropped into the drop cylinder where particles of the melt were solidified into spherical particles as they dropped, and the spherical particles were collected into a collection container made of heat-resistant cloth. The crucible used in the experiment had the structure as illustrated in FIG. 1, and the internal diameter of the nozzle was 0.5 mm. The raw material was prepared by crushing, into small pieces, p-type single-crystal silicon wafers produced by the CZ (Czochralski) method. The material of the crucible was hexagonal BN, the pressurization gas was Ar, and the heating temperature of the melt was 1700° C. Also, the pressure difference for dropping the melt into the gaseous phase was 10 kPa.

The results of the experiment were as follows. No change in the size of the obtained particles was found. Also, the dropping of the melt did not stop, and from 70 g of the Si melt stored in the crucible, 68 g of Si spherical particles were obtained. The spherical particles thus obtained were approximately 1 mm in diameter and had almost uniform particle size distribution. After the use of the hexagonal BN crucible, the metallic luster of the inner and bottom faces of the crucible was retained.

COMPARATIVE EXAMPLE 1

An experiment was performed under the same conditions of Example 1 except that the material of the crucible was carbon, the pressurization gas was N$_2$, and the heating temperature of the melt was 1500° C.

The results of the experiment were as follows. Immediately after the start of the dropping of the melt, the size of the obtained particles was small, but it gradually became larger with the passage of time and the dropping of the melt stopped ultimately although the pressure difference of 10 kPa was maintained. Thereafter, the pressure difference was raised to 30 kPa, but the dropping was not resumed thereby, and the experiment was therefore stopped.

The reason of the increase in particle size with the passage of time is as follows. With an increase in wettability of the carbon by the melt, Si gradually adhered around the nozzle, so that the adhered Si dropped in a lump. Also, the reason of the stop of the dropping is that the reaction products of the molten silicon and carbon or N$_2$ such as SiC and Si$_3$N$_4$ accumulated inside the nozzle, ultmately clogging the nozzle.

The small spherical particles obtained immediately after the start of the dropping of the melt were approximately 1 mm in diameter, and the large spherical particles obtained thereafter were approximately 10 mm in diameter. After the use of the carbon crucible, solidified Si was found around the nozzle on the bottom face of the crucible.

COMPARATIVE EXAMPLE 2

An experiment was performed under the same conditions of Example 1 except that the material of the crucible was SiC, the pressurization gas was N$_2$, and the heating temperature of the melt was 1600° C.

The experiment was started at the pressure difference of 10 kPa, but the melt did not drop into the gaseous phase, so the pressure difference was gradually raised. When it reached 33 kPa, the dropping was started. Immediately after the start of the dropping, the size of the obtained particles was small, but it gradually became larger with the passage of time and the dropping of the melt stopped ultimately although the pressure difference of 33 kPa was maintained. Thereafter, the pressure difference was raised to 50 kPa, but the dropping was not resumed thereby, and the experiment was therefore stopped.

The reason of the increase in particle size with the passage of time is as follows. With an increase in wettability of the SiC by the melt, Si gradually adhered around the nozzle, so that the adhered Si dropped in a lump. Also, the reason of the stop of the dropping is that $Si_3N_4$, which was the reaction product of the melt and $N_2$, accumulated inside the nozzle, ultimately clogging the nozzle.

The small spherical particles obtained immediately after the start of the dropping of the melt were approximately 1 mm in diameter, and the large spherical particles obtained thereafter were approximately 10 mm in diameter. After the use of the SiC crucible, solidified Si was found around the nozzle on the bottom face of the crucible.

COMPARATIVE EXAMPLE 3

An experiment was performed under the same conditions of Example 1 except that the pressurization gas was $N_2$.

The results of the experiment were as follows. Immediately after the start of the dropping of the melt, the size of the obtained particles was small, but it became larger and then became smaller. This cycle of the particle size change was repeated several times, and the dropping of the melt stopped ultimately. Thereafter, the pressure difference was raised to 50 kPa from 10 kPa, but the dropping was not resumed thereby, and the experiment was therefore stopped.

The reason of the repeated cycles of the particle size change is the repetition of such a cycle that $Si_3N_4$, the reaction product of the melt and $N_2$, accumulated inside the nozzle, was washed away by the melt, and accumulated again. Also, the reason of the stop of the dropping of the melt is that $Si_3N_4$, the reaction product of the melt and $N_2$, accumulated inside the nozzle, ultimately clogging the nozzle.

The small spherical particles obtained immediately after the start of the dropping were approximately 1 mm in diameter, and the large spherical particles obtained thereafter were approximately 3 mm in diameter. After the use of the hexagonal BN crucible, light gray $Si_3N_4$ was found on the inner face of the crucible. There was no metallic luster on the surface of the solid Si which remained in the crucible after the experiment, because the surface of the Si was covered with a film of $Si_3N_4$.

EXAMPLE 2

Using the apparatus of FIG. 7, a raw material Si was heated to 1500° C., and the stability of the dropping of the melt was evaluated. A drop cylinder with a height of 7 m was attached to the apparatus of FIG. 7, and the melt was dropped into the drop cylinder where particles of the melt were solidified into spherical particles as they dropped, and the spherical particles were collected into a collection container made of heat-resistant cloth. The crucible used in this example had the structure as illustrated in FIG. 1. The crucible material was zirconia, the internal diameter of the nozzle was 0.3 mm, and the pressurization gas was Ar. Also, the pressure difference for dropping the melt into the gaseous phase was 30 kPa.

Apart from the above-described experiment of dropping the melt, a sample of solidified melt was measured to find its impurities and specific resistivity. The measurement sample for impurities and specific resistivity was prepared by heating and melting a raw material in another crucible of the same specifications as those of the crucible used in the dropping experiment, taking out the melt without dropping it, solidifying it by natural cooling, and cutting it into the form of a plate. The heating conditions of the raw material and the atmosphere gas during the heating were the same as those of the heating conditions and the pressurization gas in the dropping experiment. The measurement of the impurities was performed by secondary ion mass spectrometry.

As the raw material, the same pieces of p-type single-crystal silicon wafers as those of Example 1 were used. The measurements of the impurities contained in the raw material by secondary ion mass spectrometry were B:$1\times10^{16}$ atoms/cm$^3$, O:$1\times10^{18}$ atoms/cm$^3$, and C:$7\times10^{15}$ atoms/cm$^3$, and Al, Zr and Y were not detected. The measured specific resistivity was 1 to 2 Ω·cm.

The results of the melt dropping experiment were as follows. The dropping of the melt was completed in a stable state without stopping during the pressurization, and almost no change in the size of the obtained particles was found. From 80 g of the raw material stored in the crucible, 78 g of spherical particles were obtained. After the use of the crucible, no silicon was found around the nozzle on the bottom face of the crucible. The spherical particles thus obtained were approximately 1 mm in diameter and had almost uniform particle size distribution.

The impurities of the sample of solidified melt were measured, and Zr and O which are the elements constituting the crucible material ($ZrO_2$) were the elements to be detected in the measurement. As a result, no Zr was detected, and the concentration of O was $1\times10^{18}$ atoms/cm$^3$, which was the same impurity concentration as that of the raw material. Also, the measured specific resistivity of the sample was 1.7 Ω·cm, which was the same level as the specific resistivity of the raw material. Accordingly, it was confirmed that the amount of impurities included in the molten silicon from the crucible was so small as to be undetectable.

EXAMPLE 3

A melt dropping experiment and measurements of impurities and specific resistivity were performed in the same manner as in Example 2 except for the use of stabilized zirconia containing 8 mol % yttria as the crucible material.

The results of the melt dropping experiment were as follows. The dropping of the molten silicon was completed in a stable state without stopping during the pressurization, and almost no change was found in the size of the obtained particles. From 80 g of the raw material stored in the crucible, 79 g of spherical particles were obtained. After the use of the crucible, no silicon was found around the nozzle on the bottom face of the crucible. The spherical particles thus obtained were approximately 1 mm in diameter and had almost uniform particle size distribution.

The impurities of a sample of solidified melt were measured, and Zr, Y and O which are the elements constituting the crucible material ($ZrO_2+Y_2O_3$) were the elements to be detected in the measurement. As a result, Zr and Y were not detected, and the concentration of O was $1\times10^{18}$ atoms/cm$^3$, which was the same impurity concentration as that of the raw material. Also, the measured specific resistivity of the sample was 1.8 Ω·cm, which was the same level as the specific resistivity of the raw material. Accordingly, it was confirmed that the amount of impurities included in the molten silicon from the crucible was so small as to be undetectable.

COMPARATIVE EXAMPLE 4

A melt dropping experiment and measurements of impurities and specific resistivity were performed in the same manner as in Example 2 except that the crucible material was carbon, the internal diameter of the nozzle was 0.5 mm, the pressurization gas was $N_2$, and the pressure difference was 10 kPa.

The results of the melt dropping experiment were as follows. Immediately after the start of the dropping, the size of the obtained particles was small, but it gradually became larger with the passage of time and the dropping of the melt stopped ultimately although the pressure difference of 10 kPa was maintained. Thereafter, the pressure difference was raised to 30 kPa, but the dropping was not resumed thereby, and the dropping experiment was therefore stopped.

The reason of the increase in particle size with the passage of time is as follows. With an increase in wettability of the carbon by the melt, the melt gradually adhered around the nozzle on the bottom face of the crucible, so that the adhered melt dropped in a lump. Also, the reason of the stop of the dropping is that the reaction product of the carbon and the melt (SiC) and the reaction product of the $N_2$ gas and the melt ($Si_3N_4$) accumulated inside the nozzle, ultimately clogging the nozzle.

After the use of the crucible, a large amount of wet Si was found around the nozzle on the bottom face of the crucible. Also, the small spherical particles obtained immediately after the start of the dropping were approximately 1 mm in diameter, and the large spherical particles obtained thereafter were approximately 10 mm in diameter.

The impurities of a sample of solidified melt were measured, and carbon (C) which is the element constituting the crucible material was the element to be detected in the measurement. As a result, the concentration of C was $3 \times 10^{18}$ atoms/cm$^3$. This impurity concentration is significantly higher than the C concentration of the raw material of $7 \times 10^{15}$ atoms/cm$^3$, and this is due to the inclusion of a large amount of carbon into the melt from the crucible. The measured specific resistivity of the sample was 1.0 Ω·cm, which was the same level as the specific resistivity of the raw material.

COMPARATIVE EXAMPLE 5

A melt dropping experiment and measurements of impurities and specific resistivity were performed in the same manner as in Example 2 except for the use of carbon as the crucible material.

The results of the melt dropping experiment were as follows. Immediately after the start of the dropping of the melt, the size of the obtained particles was small, but it gradually became larger with the passage of time and the dropping of the melt stopped ultimately although the pressure difference of 30 kPa was maintained. Thereafter, the pressure difference was raised to 50 kPa, but the dropping was not resumed thereby, and the experiment was therefore stopped.

The reason of the increase in particle size with the passage of time is as follows. With an increase in wettability of the carbon by the melt, the molten silicon gradually adhered around the nozzle on the bottom face of the crucible, so that the adhered melt dropped in a lump. Also, the reason of the stop of the dropping is that the reaction product of the carbon and the melt (SiC) accumulated inside the nozzle, ultimately clogging the nozzle.

After the use of the crucible, wet silicon was found around the nozzle on the bottom face of the crucible. Also, the small spherical particles obtained immediately after the start of the dropping were approximately 1 mm in diameter, and the large spherical particles obtained thereafter were approximately 7 mm in diameter. The impurities and specific resistivity of a sample of solidified melt were measured, and the same measurements as those of Comparative Example 4 were obtained.

COMPARATIVE EXAMPLE 6

A melt dropping experiment and measurements of impurities and specific resistivity were performed in the same manner as in Example 2 except for the use of alumina as the crucible material.

The results of the melt dropping experiment were as follows. The dropping of the melt was completed in a stable state without stopping during the pressurization, and no change in the size of the obtained particles was found. From 80 g of the raw material stored in the crucible, 78 g of spherical particles were obtained. After the use of the crucible, a small amount of Si was found around the nozzle on the bottom face of the crucible. The Si particles thus obtained were approximately 1 mm in diameter and had almost uniform particle size distribution.

The impurities of a sample of solidified melt were measured, and Al and O which are the elements constituting the crucible material ($Al_2O_3$) were the elements to be detected in the measurement. As a result, the concentration of Al was $1 \times 10^{17}$ atoms/cm$^3$, and the concentration of O was $2 \times 10^{18}$ atoms/cm$^3$. In the raw material, no Al was detected and the concentration of O was $1 \times 10^{18}$ atoms/cm$^3$. This indicates that Al and O were included into the melt from the crucible as impurities. Also, the measured specific resistivity of the sample was 0.2 Ω·cm, which is much lower than the measured specific resistivity of the raw material. This is attributed to the impurity Al which has an action of a p-type impurity on Si.

COMPARATIVE EXAMPLE 7

A melt dropping experiment and measurements of impurities and specific resistivity were performed in the same manner as in Example 2 except that the crucible material was stabilized zirconia containing 8 mol % yttria and the pressurization gas was $N_2$.

The results of the melt dropping experiment were as follows. Although the pressure difference of 30 kPa was retained, the melt dropped intermittently, i.e., short-time dropping of the melt and suspension of the dropping were repeated several times, and the dropping stopped ultimately. Thereafter, the pressure difference was raised to 50 kPa, but the dropping was not resumed thereby, and the experiment was therefore stopped.

The reason of the repeated intermittent dropping is as follows. When the reaction product of $N_2$ and Si ($Si_3N_4$) accumulated inside the nozzle to narrow the effective internal diameter of the nozzle, the accumulated reaction product was washed away by the melt so that the narrowed internal diameter returned to the original internal diameter, and this phenomenon was repeated. Also, the reason of the stop of the dropping of the melt is that the reaction product of $Si_3N_4$ accumulated inside the nozzle, ultimately clogging the nozzle.

After the use of the crucible, no Si was found around the nozzle on the bottom face of the crucible. Also, among the spherical particles thus obtained, other than the particles which were approximately 1 mm in diameter, there were a large number of particles which were approximately 0.7 mm or less in diameter.

The impurities of a sample of solidified melt were measured, and Zr, Y and O which are the elements constituting the crucible material ($ZrO_2+Y_2O_3$) were the elements to be detected in the measurement. As a result, Zr and Y were not detected, and the concentration of O was $1\times10^{18}$ atoms/cm$^3$, which was the same impurity concentration as that of the raw material. Also, the measured specific resistivity of the sample was 1.5 $\Omega\cdot$cm, which was the same level as the specific resistivity of the raw material.

EXAMPLE 4

Using the apparatus of FIG. 8, the stability of the dropping of the melt was evaluated. A drop cylinder with a height of 7 m was attached to the apparatus of FIG. 8, and a melt was dropped into the drop cylinder where particles of the melt were solidified into spherical particles as they dropped, and the spherical particles were collected into a collection container made of heat-resistant cloth. The raw material was prepared by crushing, into small pieces, p-type single-crystal silicon wafers produced by the CZ method, and 2000 g of this raw material was used in one experiment. The pressurization gas was Ar, and the pressure difference was 30 kPa. The heating temperature of the raw material and the temperature of the melt in the crucible were 1500° C.

The crucibles used in this example had the structure as illustrated in FIG. 12, wherein the material of the crucible body was synthetic quartz glass, the internal diameter of the nozzle was 0.3 mm, and the material of the support member was high-purity carbon. The diameter of the opening of the support member was varied to 1 mm, 3 mm, 10 mm, and 40 mm. Using these crucibles, melt dropping experiments were performed.

The results of the melt dropping experiments were as follows. When the diameter of the opening of the support member was from 1 to 10 mm, the dropping of the melt continued smoothly for 60 minutes until all the melt in the crucible was dropped. The deformation of the quartz glass near the nozzle after the experiment was so small as to be unmeasurable, and the deformation of the nozzle was hardly observed. When the diameter of the opening of the support member was 40 mm, the dropping of the melt stopped in 2 minutes and 9 seconds. The amount of deformation δ of the quartz glass near the nozzle after the experiment was 1.5 mm, which was relatively large, so that the upper part of the nozzle was almost closed. As described above, even when the diameter of the opening was too large, improved results were obtained in comparison with Comparative Example 8 which will be described later, but the effects of the present invention obtained when the diameter of the opening was from 1 to 10 mm were not sufficiently exhibited.

EXAMPLE 5

A melt dropping experiment was performed in the same manner as in Example 4 except for the use of a crucible having the structure as illustrated in FIG. 15 in which the material of the crucible body-support member was high-purity carbon, the material of the nozzle member was synthetic quartz glass, the internal diameter of the nozzle was 0.3 mm, and the outer diameter of the nozzle member was 3 mm.

The results of the melt dropping experiment were as follows. The dropping of the melt continued smoothly for 60 minutes until all the melt in the crucible was dropped. The deformation of the quartz glass near the nozzle after the experiment was so small as to be unmeasurable, and the deformation of the nozzle was hardly observed.

EXAMPLE 6

A melt dropping experiment was performed in the same manner as in Example 4 except for the use of a crucible having the structure as illustrated in FIG. 17 in which the materials of the crucible body-support member (first support member) and the second support member were high-purity carbon, the material of the nozzle member was synthetic quartz glass, the internal diameter of the nozzle was 0.3 mm, the outer diameter of the nozzle member was 24 mm, and the diameter of the opening of the second support member was 3 mm.

The results of the melt dropping experiment were as follows. The dropping of the melt continued smoothly for 60 minutes until all the melt in the crucible was dropped. The deformation of the quartz glass near the nozzle after the experiment was so small as to be unmeasurable, and the deformation of the nozzle was hardly observed.

COMPARATIVE EXAMPLE 8

A melt dropping experiment was performed in the same manner as in Example 4 except for the use of a crucible having the structure as illustrated in FIG. 9 in which the crucible was wholly made of synthetic quartz glass and the internal diameter of the nozzle was 0.3 mm.

The results of the melt dropping experiment were as follows. The dropping of the melt stopped in 26 seconds, and the amount of deformation of the bottom of the crucible after the experiment was 5.3 mm, which was large, so that the upper part of the nozzle was closed.

According to the present invention, spherical particles of a semiconductor such as silicon or metal having relatively high melting point and high reactivity can be produced with uniform particle size distribution without inclusion of impurities with good productivity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing semiconductor or metal particles comprising the steps of:
    storing a semiconductor or metal melt in a crucible having a nozzle, said crucible being made of a material comprising $Si_3N_4$ at least near the nozzle;
    supplying a gas comprising at least one selected from the group consisting of He, Ne, Ar, Kr and Xe into said crucible such that the pressure of the supplied gas in a space over the melt in said crucible is higher than the pressure of a gaseous phase into which said melt is dropped;

dropping the melt from said nozzle into said gaseous phase by the pressure of said gas to form liquid particles; and solidifying said liquid particles in said gaseous phase to obtain semiconductor or metal particles.

2. The method for producing semiconductor or metal particles in accordance with claim 1, wherein said melt is molten silicon.

3. The method for producing semiconductor or metal particles in accordance with claim 1, wherein said crucible is wholly made of said material.

4. The method for producing semiconductor or metal particles in accordance with claim 1, wherein said crucible comprises: a crucible body having a mounting hole at its bottom; and a nozzle member mounted on said mounting hole, said nozzle member having a nozzle and being made of said material.

5. The method for producing semiconductor or metal particles in accordance with claim 1, wherein a coating layer comprising said material is formed at least near the nozzle on the bottom face of said crucible.

6. The method for producing semiconductor or metal particles in accordance with claim 1, wherein the internal diameter of said nozzle is from 0.05 to 2.0 mm, and the length of the nozzle is from 1 to 50 times the internal diameter of the nozzle.

7. The method for producing semiconductor or metal particles in accordance with claim 1, wherein the upper opening end of said nozzle is curved so that the internal diameter of said nozzle becomes greater.

8. The method for producing semiconductor or metal particles in accordance with claim 1, wherein the lower opening end of said nozzle is curved so that the internal diameter of said nozzle becomes greater.

9. The method for producing semiconductor or metal particles in accordance with claim 1, wherein the inner face of said crucible is inclined and tapered down toward the upper opening end of the nozzle.

10. The method for producing semiconductor or metal particles in accordance with claim 1, wherein the pressure of said gas is higher than that of the gaseous phase into which said melt is dropped by 1 to 100 kPa.

11. A method for producing semiconductor or metal particles comprising the steps of:

storing a semiconductor or metal melt in a crucible comprising a crucible body having a nozzle at its bottom and which is made of quartz glass; and a heat resistant support member for supporting the outer side faces and bottom of said crucible body except at least near the nozzle;

supplying a gas comprising at least one selected from the group consisting of He, Ne, Ar, Kr and Xe into said crucible such that the pressure of the supplied gas in a space over the melt in said crucible is higher than the pressure of a gaseous phase into which said melt is dropped;

dropping said melt from said nozzle into said gaseous phase by the pressure of said gas to form liquid particles;

solidifying said liquid particles in said gaseous phase to obtain semiconductor or metal particles, and utilizing said support member to resist a load exerted by said melt and the pressure of the gas supplied to the space over the melt to prevent deformation of the nozzle, so that the melt is dropped from the nozzle at a substantially constant rate.

12. The method for producing semiconductor or metal particles in accordance with claim 11, wherein said melt is molten silicon.

13. The method for producing semiconductor or metal particles in accordance with claim 11, wherein the internal diameter of said nozzle is from 0.05 to 2.0 mm, and the length of the nozzle is from 1 to 50 times the internal diameter of the nozzle.

14. The method for producing semiconductor or metal particles in accordance with claim 11, wherein the upper opening end of said nozzle is curved so that the internal diameter of said nozzle becomes greater.

15. The method for producing semiconductor or metal particles in accordance with claim 11, wherein the lower opening end of said nozzle is curved so that the internal diameter of said nozzle becomes greater.

16. The method for producing semiconductor or metal particles in accordance with claim 11, wherein the inner face of said crucible is inclined and tapered down toward the upper opening end of the nozzle.

17. The method for producing semiconductor or metal particles in accordance with claim 11, wherein the pressure of said gas is higher than that of the gaseous phase into which said melt is dropped by 1 to 100 kPa.

18. A method for producing semiconductor or metal particles comprising the steps of:

storing a semiconductor or metal melt in a crucible, said crucible comprising a support member having a mounting hole at its bottom; and a nozzle member mounted on said mounting hole, said nozzle member having a nozzle and being made of quartz glass;

supplying a gas comprising at least one selected from the group consisting of He, Ne, Ar, Kr and Xe into said crucible such that the pressure of the supplied gas in a space over the melt in said crucible is higher than the pressure of a gaseous phase into which said melt is dropped;

dropping said melt from said nozzle into said gaseous phase by the pressure of said gas to form liquid particles; and solidifying said liquid particles in said gaseous phase to obtain semiconductor or metal particles; and utilizing said support member to resist a load exerted by said melt and the pressure of the gas supplied to the space over the melt to prevent deformation of the nozzle, so that the melt is dropped from the nozzle at a substantially constant rate.

19. The method for producing semiconductor or metal particles in accordance with claim 18, wherein said crucible further comprises another supporting member for supporting at least the bottom of said support member and the bottom of said nozzle member except near the nozzle.

20. The method for producing semiconductor or metal particles in accordance with claim 18, wherein said melt is molten silicon.

21. The method for producing semiconductor or metal particles in accordance with claim 18, wherein the internal diameter of said nozzle is from 0.05 to 2.0 mm, and the length of the nozzle is from 1 to 50 times the internal diameter of the nozzle.

22. The method for producing semiconductor or metal particles in accordance with claim 18, wherein the upper opening end of said nozzle is curved so that the internal diameter of said nozzle becomes greater.

23. The method for producing semiconductor or metal particles in accordance with claim 18, wherein the lower opening end of said nozzle is curved so that the internal diameter of said nozzle becomes greater.

24. The method for producing semiconductor or metal particles in accordance with claim 18, wherein the inner face of said crucible is inclined and tapered down toward the upper opening end of the nozzle.

25. The method for producing semiconductor or metal particles in accordance with claim 18, wherein the pressure of said gas is higher than that of the gaseous phase into which said melt is dropped by 1 to 100 kPa.

* * * * *